US009678863B2

United States Patent
Talagala et al.

(10) Patent No.: US 9,678,863 B2
(45) Date of Patent: Jun. 13, 2017

(54) HYBRID CHECKPOINTED MEMORY

(71) Applicant: Fusion-io, Inc., Salt Lake City, UT (US)

(72) Inventors: Nisha Talagala, Livermore, CA (US); Swaminathan Sundararaman, Santa Clara, CA (US); Nick Piggin, Yarralumla (AU); Ashish Batwara, Fremont, CA (US); David Flynn, Sandy, UT (US)

(73) Assignee: SanDisk Technologies, LLC, Plano, TX (US)

( * ) Notice: Subject to any disclaimer, the term of this patent is extended or adjusted under 35 U.S.C. 154(b) by 677 days.

(21) Appl. No.: 13/786,385

(22) Filed: Mar. 5, 2013

(65) Prior Publication Data
US 2013/0332660 A1    Dec. 12, 2013

Related U.S. Application Data

(60) Provisional application No. 61/658,893, filed on Jun. 12, 2012.

(51) Int. Cl.
| G06F 12/00 | (2006.01) |
| G06F 12/02 | (2006.01) |
| G06F 12/08 | (2016.01) |
| G06F 11/14 | (2006.01) |

(52) U.S. Cl.
CPC ...... *G06F 12/0246* (2013.01); *G06F 11/1441* (2013.01); *G06F 12/08* (2013.01); *G06F 2201/815* (2013.01); *G06F 2201/82* (2013.01); *Y02B 60/1225* (2013.01)

(58) Field of Classification Search
None
See application file for complete search history.

(56) References Cited

U.S. PATENT DOCUMENTS

| 5,701,434 A | 12/1997 | Nakagawa |
| 5,799,200 A | 8/1998 | Brant et al. |
| 5,845,329 A | 12/1998 | Onishi et al. |
| 5,960,462 A | 9/1999 | Solomon et al. |
| 6,000,019 A | 12/1999 | Dykstal et al. |
| 6,170,039 B1 | 1/2001 | Kishida |

(Continued)

OTHER PUBLICATIONS

Park, Stan, "Failure-Atomic msync ( ) : A Simple and Efficient Mechanism for Preserving the Integrity of Durable Data", Apr. 15-17, 2013, pp. 14, Prague, Chech Replublic, http://www.cs.rochester.edu/~kshen/papers/eurosys2013.pdf.

(Continued)

*Primary Examiner* — David X Yi
*Assistant Examiner* — Craig Goldschmidt
(74) *Attorney, Agent, or Firm* — Kunzler Law Group, PC

(57) ABSTRACT

Apparatuses, systems, methods, and computer program products are disclosed for hybrid checkpointed memory. A method includes referencing data of a range of virtual memory of a host. The referenced data is already stored by a non-volatile medium. A method includes writing, to a non-volatile medium, data of a range of virtual memory that is not stored by the non-volatile medium. A method includes providing access to data of a range of virtual memory from a non-volatile medium using a persistent identifier associated with referenced data and written data.

24 Claims, 13 Drawing Sheets

(56) References Cited

U.S. PATENT DOCUMENTS

| | | | |
|---|---|---|---|
| 6,185,654 B1 | 2/2001 | Van Doren | |
| 6,205,521 B1 | 3/2001 | Schumann | |
| 6,336,174 B1 | 1/2002 | Li et al. | |
| 6,625,685 B1 | 9/2003 | Cho et al. | |
| 6,775,185 B2 | 8/2004 | Fujisawa et al. | |
| 7,043,599 B1 | 5/2006 | Ware et al. | |
| 7,599,967 B2 | 10/2009 | Girkar et al. | |
| 7,752,360 B2 | 7/2010 | Galles | |
| 8,826,273 B1* | 9/2014 | Chen | 718/1 |
| 8,996,827 B1* | 3/2015 | Natanzon | 711/162 |
| 2002/0069318 A1 | 6/2002 | Chow et al. | |
| 2003/0198084 A1 | 10/2003 | Fujisawa et al. | |
| 2005/0002263 A1 | 1/2005 | Iwase et al. | |
| 2005/0015539 A1 | 1/2005 | Horii et al. | |
| 2006/0004955 A1 | 1/2006 | Ware et al. | |
| 2007/0156794 A1* | 7/2007 | Kisley et al. | 707/204 |
| 2007/0179994 A1* | 8/2007 | Deguchi | G06F 11/1471 |
| 2007/0198770 A1 | 8/2007 | Horii et al. | |
| 2008/0155316 A1* | 6/2008 | Pawar et al. | 714/8 |
| 2009/0106479 A1 | 4/2009 | Okin et al. | |
| 2009/0276591 A1* | 11/2009 | Mu | G06F 11/1464 711/162 |
| 2010/0011178 A1* | 1/2010 | Feathergill | 711/162 |
| 2010/0023682 A1 | 1/2010 | Lee et al. | |
| 2010/0049929 A1* | 2/2010 | Nagarkar et al. | 711/162 |
| 2013/0091321 A1* | 4/2013 | Nishtala | G06F 12/08 711/103 |

OTHER PUBLICATIONS

Application No. PCT/US2011/064728, International Search Report and Written Opinion, Jul. 31, 2012.

Mellor, Chris, "New RAM Shunts Data into Flash in Power Cuts", The Channel, Oct. 19, 2011, http://www.channelregister.co.uk/2011/10/19/viking_hybrid_dram_nand/.

AgigaRAM Company, Technology Review.

AgigaRAM, AGIGA Tech, pp. 11.

AgigaRAM Company, Technology Review, reviewed Feb. 17, 2010.

"Finding the Perfect Memory", AGIGA Tech, Sep. 3, 2009, pp. 15, White Paper, Poway, California, US, www.agigatech.com.

"Bulletproof Memory for RAID Servers, Part 1", 2009, pp. 4, http://agigatech.com/blog/bulletproof-memory-for-raid-servers-part-1/.

Ajanovic, Jasmin, "PCI Express* (PCIe*) 3.0 Accelerator Features", Intel Corporation, White Paper, pp. 10.

"DDRdrive Hits the Ground Running—PCI-E RAM-based SSD", PC Perspective, downloaded Dec. 10, 2010, pp. 2, http://www.pcper.com/article.php?aid=704.

Hutsell, Woody, "An In-depth Look at the RamSan-500 Cached Flash Solid State Disk", Texas Memory Systems White Paper, Mar. 2008, pp. 16.

"Gigabyte iRAM Solid State SATA Storage Review", part 1, PC Perspective, downloaded Dec. 10, 2010, pp. 2, http://www.pcper.com/article.php?aid=224&type=expert.

"Gigabyte iRAM Solid State SATA Storage Review", part 2, PC Perspective, downloaded Dec. 10, 2010, pp. 4, http://www.pcper.com/article.php?aid=224&type=expert&pid=3.

Lottiaux, Renaud, "OpenMosix, OpenSSI and Kerrighed: A Comparative Study", Institut National De Recherche En Informatique Et En Automatique, Nov. 2004, pp. 23, No. 5399, Rennes Cedex, FR.

Magenheimer, Dan, [RFC Patch 0/4] (Take 2): transcendent memory ("tmem") for Linux, Jul. 7, 2009, pp. 3, http://lwn.net/Articles/340409/.

Rose, Mike, "FPGA PCIe Bandwidth", Department of Computer Science and Engineering, University of California, Jun. 9, 2010, pp. 7, Sand Diego, California, US.

Condit, Jeremy, "Better I/O Through Byte-Addressable, Persistent Memory", Microsoft Research, Oct. 11-14, 2009, pp. 14, Big Sky, Montana, US.

Wu, Michael, "eNVy: A Non-Volatile, Main Memory Storage System", ACM, 1994, pp. 12, San Jose, California, US.

Swart, Garret, "NVM Killer Apps Without the Splatter", Oracle Corporation, 2013, pp. 12.

"2013 Non_Volatile Memories Workshop", Mar. 3-5, 2013, pp. 5, nvmw.ucsd.edu/2013/program#.

"skaphan/stmmap", github, Mar. 1, 2013, pp. 8, htt;s://github.com/skaphan/stmmap#readme.

* cited by examiner

HYBRID CHECKPOINTED MEMORY

CROSS-REFERENCES TO RELATED APPLICATIONS

This application claims the benefit of U.S. Provisional Patent Application No. 61/658,893 entitled "APPARATUS, SYSTEM, AND METHOD FOR HYBRID CHECKPOINTED MEMORY" and filed on Jun. 12, 2012 for Nisha Talagala et al., which is incorporated herein by reference.

TECHNICAL FIELD

This disclosure relates to memory and more particularly to exposing hybrid checkpointed memory to applications and/or operating systems.

BACKGROUND

Volatile memory such as random access memory (RAM) typically has faster access times than non-volatile storage, such as NAND flash, magnetic hard disk drives, or the like. While the capacities of volatile memory continue to increase as the price of volatile memory decreases, volatile memory remains more expensive per unit of capacity than most non-volatile storage. This often leads to design tradeoffs between the speed and performance of volatile memory and the lower price of non-volatile storage at larger capacities.

SUMMARY

Methods are presented for hybrid checkpointed memory. In one embodiment, a method includes referencing data of a range of virtual memory of a host. The referenced data, in certain embodiments, is already stored by a non-volatile medium. A method, in another embodiment, includes writing, to a non-volatile medium, data of a range of virtual memory that is not stored by a non-volatile medium. In a further embodiment, a method includes providing access to data of a range of virtual memory from a non-volatile medium using a persistent identifier associated with the referenced data and the written data.

Apparatuses are presented for hybrid checkpointed memory. In one embodiment, an extended memory module is configured to use main memory of a host and a non-volatile recording medium as virtual memory of the host. A checkpoint module, in certain embodiments, is configured to destage data from main memory to non-volatile memory in response to a checkpoint request for the data.

In one embodiment, an apparatus includes means for mapping multiple logical clones of a file into virtual memory of a host. Virtual memory, in certain embodiments, is backed by both volatile memory and non-volatile storage. In a further embodiment, an apparatus includes means for merging changes to multiple logical clones of a file in virtual memory. An apparatus, in another embodiment, includes means for checkpointing merged changes to non-volatile storage.

A computer program product comprising a computer readable storage medium storing computer usable program code executable to perform operations for hybrid checkpointed memory is presented. In one embodiment, an operation includes cloning data of a range of virtual memory in response to a checkpoint event for the range of virtual memory. A range of virtual memory, in certain embodiments, includes data stored in volatile memory and data stored in a non-volatile memory medium. An operation, in another embodiment, includes flushing dirty data of a range of virtual memory to the non-volatile memory medium in response to a checkpoint event. In a further embodiment, an operation includes providing access to data of a range of virtual memory while the dirty data is being flushed using a clone of the data and/or the data of the range of virtual memory.

Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

Furthermore, the described features, advantages, and characteristics of the disclosure may be combined in any suitable manner in one or more embodiments. The disclosure may be practiced without one or more of the specific features or advantages of a particular embodiment. In other instances, additional features and advantages may be recognized in certain embodiments that may not be present in all embodiments of the disclosure.

These features and advantages of the present disclosure will become more fully apparent from the following description and appended claims, or may be learned by the practice of the disclosure as set forth hereinafter.

BRIEF DESCRIPTION OF THE DRAWINGS

In order that the advantages will be readily understood, a more particular description will be rendered by reference to specific embodiments that are illustrated in the appended drawings. Understanding that these drawings depict only typical embodiments and are not therefore to be considered to be limiting in scope, embodiments of the disclosure will be described and explained with additional specificity and detail through the use of the accompanying drawings, in which.

DETAILED DESCRIPTION

Figure 1A:
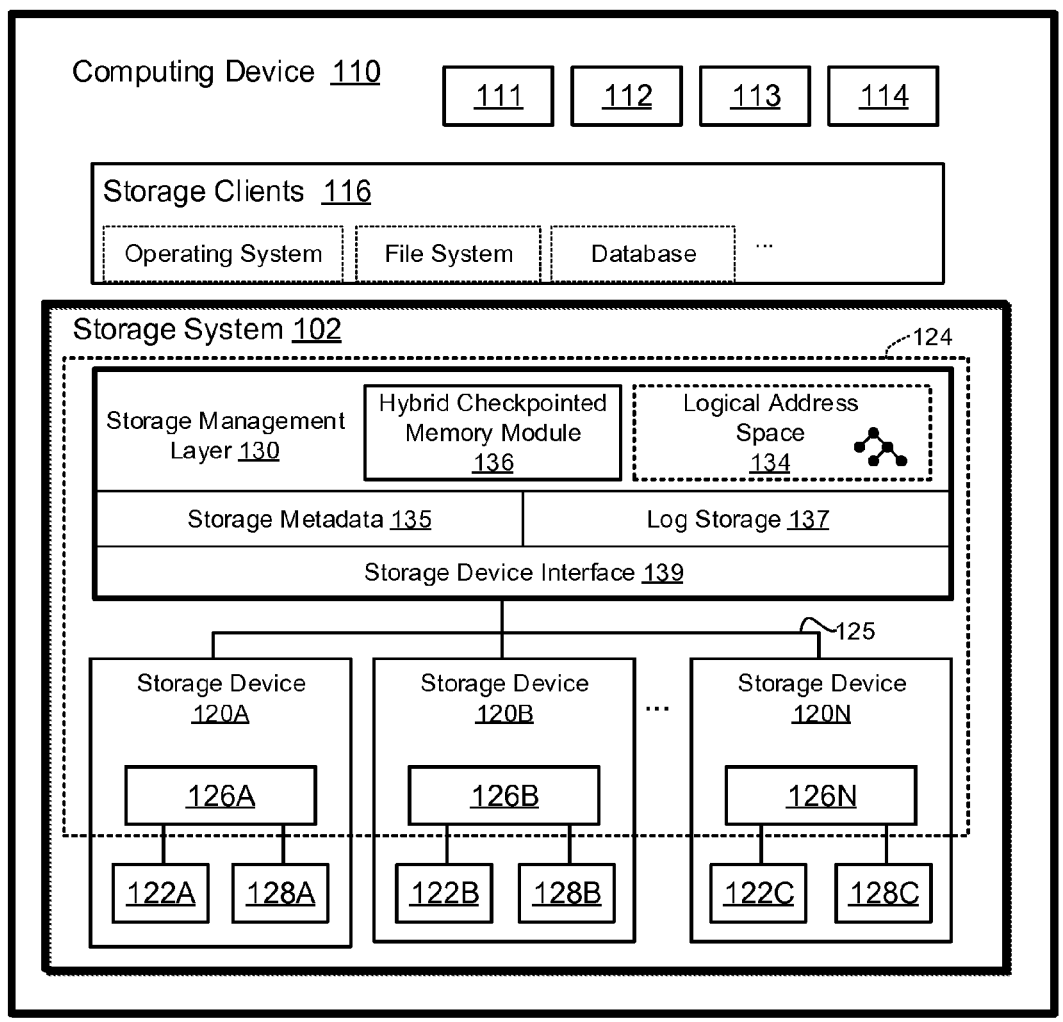
FIG. 1A is a schematic block diagram illustrating one embodiment of a system for hybrid checkpointed memory.

Reference throughout this specification to features, advantages, or similar language does not imply that all of the features and advantages that may be realized with the present disclosure should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure. These features and advantages of the present disclosure will become more fully apparent from the following description and appended claims, or may be learned by the practice of the disclosure as set forth hereinafter.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment.

Reference to a computer readable medium may take any form capable of storing machine-readable instructions on a digital processing apparatus. A computer readable medium may be embodied by a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the present disclosure may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the disclosure. One skilled in the relevant art will recognize, however, that the embodiments of the disclosure may be practiced without one or more of the specific details, or with other methods, components, materials, and so forth. In other instances, well-known structures, materials, or operations are not shown or described in detail to avoid obscuring aspects of the disclosure.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

According to various embodiments, a storage controller manages one or more storage devices. The storage device(s) may comprise non-volatile storage devices, such as solid-state storage device(s), that are arranged and/or partitioned into a plurality of addressable, media storage locations. As used herein, a media storage location refers to any physical unit of storage (e.g., any physical storage media quantity on a storage device). Media storage units may include, but are not limited to: pages, storage divisions, erase blocks, sectors, blocks, collections or sets of physical storage locations (e.g., logical pages, logical erase blocks, etc., described below), or the like.

The storage controller may comprise a storage management layer ("SML"), which may present a logical address space to one or more storage clients. One example of an SML is the Virtual Storage Layer® of Fusion-io, Inc. of Salt Lake City, Utah. Alternatively, each non-volatile memory device may comprise a non-volatile memory media controller, which may present a logical address space to the storage clients. As used herein, a logical address space refers to a logical representation of storage resources. The logical address space may comprise a plurality (e.g., range) of logical identifiers. As used herein, a logical identifier refers to any identifier for referencing a storage resource (e.g., data), including, but not limited to: a logical block address ("LBA"), cylinder/head/sector ("CHS") address, a file name, an object identifier, an inode, a Universally Unique Identifier ("UUID"), a Globally Unique Identifier ("GUID"), a hash code, a signature, an index entry, a range, an extent, or the like. The logical address space, logical identifiers, and relationships between logical identifiers and storage resources define a "logical interface" through which storage clients access storage resources. As used herein, a logical interface refers to a path, process, set of process steps, set of data structures or other mechanism for referencing and/or interfacing with a storage resource. A logical interface may include, but is not limited to: a logical identifier, a range or extent of logical identifiers, a reference to a logical identifier (e.g., a link between logical identifiers, a pointer to a logical identifier, etc.), a reference to a virtual storage unit, or the like. It should be noted that a logical interface as used herein is not an application programming interface (API).

The SML may maintain storage metadata, such as a forward index, to map logical identifiers of the logical address space to media storage locations on the storage device(s). The SML may provide for arbitrary, "any-to-any" mappings to physical storage resources. Accordingly, there may be no pre-defined and/or pre-set mappings between logical identifiers and particular, media storage locations and/or media addresses. As used herein, a media address or physical address refers to an address of a storage resource that uniquely identifies one storage resource from another to a controller that manages a plurality of storage resources, by way of example, a media address includes, but is not limited to: the address of a media storage location, a physical storage unit, a collection of physical storage units (e.g., a logical storage unit), a portion of a media storage unit (e.g., a logical storage unit address and offset, range, and/or extent), or the like. Accordingly, the SML may map logical identifiers to physical data resources of any size and/or granularity, which may or may not correspond to the underlying data partitioning scheme of the storage device(s). For example, in some embodiments, the storage controller is configured to store data within logical storage units that are formed by logically combining a plurality of physical storage units, which may allow the storage controller to support many different virtual storage unit sizes and/or granularities.

As used herein, a logical storage element refers to a set of two or more non-volatile storage elements that are or are capable of being managed in parallel (e.g., via an I/O and/or control bus). A logical storage element may comprise a plurality of logical storage units, such as logical pages, logical storage divisions (e.g., logical erase blocks), and so on. Each logical storage unit may be comprised of storage units on the non-volatile storage elements in the respective logical storage element. As used herein, a logical storage unit refers to logical construct combining two or more physical storage units, each physical storage unit on a respective solid-state storage element in the respective logical storage element (each solid-state storage element being accessible in parallel). As used herein, a logical storage division refers to a set of two or more physical storage divisions, each physical storage division on a respective solid-state storage element in the respective logical storage element.

The logical address space presented by the storage management layer may have a logical capacity, which may comprise a finite set or range of logical identifiers. The logical capacity of the logical address space may correspond to the number of available logical identifiers in the logical address space and/or the size and/or granularity of the data referenced by the logical identifiers. For example, the logical capacity of a logical address space comprising $2^{32}$ unique logical identifiers, each referencing 2048 bytes (2 kb) of data may be $2^{43}$ bytes. In some embodiments, the logical address space may be "thinly provisioned." As used herein, a thinly provisioned logical address space refers to a logical address space having a logical capacity that exceeds the physical storage capacity of the underlying storage device(s). For example, the storage management layer may present a 64-bit logical address space to the storage clients (e.g., a logical address space referenced by 64-bit logical identifiers), which exceeds the physical storage capacity of the underlying storage devices. The large logical address space may allow storage clients to allocate and/or reference contiguous ranges of logical identifiers, while reducing the chance of naming conflicts. The storage management layer may leverage the "any-to-any" mappings between logical identifiers and physical storage resources to manage the logical address space independently of the underlying physical storage devices. For example, the storage management layer may add and/or remove physical storage resources seamlessly, as needed, and without changing the logical interfaces used by the storage clients.

The storage controller may be configured to store data in a contextual format. As used herein, a contextual format refers to a "self-describing" data format in which persistent contextual metadata is stored with the data on the physical storage media. The persistent contextual metadata provides context for the data it is stored with. In certain embodiments, the persistent contextual metadata uniquely identifies the data that the persistent contextual metadata is stored with. For example, the persistent contextual metadata may uniquely identify a sector of data owned by a storage client from other sectors of data owned by the storage client. In a further embodiment, the persistent contextual metadata identifies an operation that is performed on the data. In a further embodiment, the persistent contextual metadata identifies an order of a sequence of operations performed on the data. In a further embodiment, the persistent contextual metadata identifies security controls, a data type, or other attributes of the data. In certain embodiment, the persistent contextual metadata identifies at least one of a plurality of aspects, including data type, a unique data identifier, an operation, and an order of a sequence of operations performed on the data. The persistent contextual metadata may include, but is not limited to: a logical interface of the data, an identifier of the data (e.g., a logical identifier, file name, object id, label, unique identifier, or the like), reference(s) to other data (e.g., an indicator that the data is associated with other data), a relative position or offset of the data with respect to other data (e.g., file offset, etc.), data size and/or range, and the like. The contextual format data format may comprise a packet format comprising a data segment and one or more headers. Alternatively, a contextual data format may associate data with context information in other ways (e.g., in a dedicated index on the non-volatile storage media, a storage division index, or the like). Accordingly, a contextual data format refers to a data format that associates the data with a logical interface of the data (e.g., the "context" of the data). A contextual data format is self-describing in that the contextual data format includes the logical interface of the data.

In some embodiments, the contextual data format may allow data context to be determined (and/or reconstructed) based upon the contents of the non-volatile storage media, and independently of other storage metadata, such as the arbitrary, "any-to-any" mappings discussed above. Since the media storage location of data is independent of the logical interface of the data, it may be inefficient (or impossible) to determine the context of data based solely upon the media storage location or media address of the data. Storing data in a contextual format on the non-volatile storage media may allow data context to be determined without reference to other storage metadata. For example, the contextual data format may allow the logical interface of data to be reconstructed based only upon the contents of the non-volatile storage media (e.g., reconstruct the "any-to-any" mappings between logical identifier and media storage location).

In some embodiments, the storage controller may be configured to store data on an asymmetric, write-once storage media, such as solid-state storage media. As used herein, a "write once" storage media refers to a storage media that is reinitialized (e.g., erased) each time new data is written or programmed thereon. As used herein, "asymmetric" storage media refers to storage media having different latencies for different storage operations. Many types of solid-state storage media are asymmetric; for example, a read operation may be much faster than a write/program operation, and a write/program operation may be much faster than an erase operation (e.g., reading the media may be hundreds of times faster than erasing, and tens of times faster than programming the media). The storage media may be partitioned into storage divisions that can be erased as a group (e.g., erase blocks) in order to, inter alia, account for the asymmetric properties of the media. As such, modifying a single data segment "in-place" may require erasing the entire erase block comprising the data, and rewriting the modified data to the erase block, along with the original, unchanged data. This may result in inefficient "write amplification," which may excessively wear the media. Therefore, in some embodiments, the storage controller may be configured to write data "out-of-place." As used herein, writing data "out-of-place" refers to writing data to different media storage location(s) rather than overwriting the data "in-place" (e.g., overwriting the original physical location of the data). Modifying data "out-of-place" may avoid write amplification, since existing, valid data on the erase block with the data to be modified need not be erased and recopied. Moreover, writing data "out-of-place" may remove erasure from the latency path of many storage operations (the erasure latency is no longer part of the "critical path" of a write operation).

The storage controller may comprise one or more processes that operate outside of the regular path for servicing of storage operations (the "path" for performing a storage operation and/or servicing a storage request). As used herein, the "regular path for servicing a storage request" or "path for servicing a storage operation" (also referred to as a "critical path") refers to a series of processing operations needed to service the storage operation or request, such as a read, write, modify, or the like. The path for servicing a storage request may comprise receiving the request from a storage client, identifying the logical interface of the request (e.g., logical identifiers pertaining to the request), performing one or more storage operations on a non-volatile storage media, and returning a result, such as acknowledgement or data. Processes that occur outside of the path for servicing storage requests may include, but are not limited to: a groomer, de-duplication, and so on. These processes may be implemented autonomously, and in the background from servicing storage requests, such that they do not interfere with or impact the performance of other storage operations and/or requests. Accordingly, these processes may operate independent of servicing storage requests.

In some embodiments, the storage controller comprises a groomer, which is configured to reclaim storage divisions (erase blocks) for reuse. The write out-of-place write paradigm implemented by the storage controller may result in "obsolete" or "invalid" data remaining on the non-volatile storage media. For example, overwriting data X with data Y may result in storing Y on a new storage division (rather than overwriting X in place), and updating the "any-to-any" mappings of the storage metadata to identify Y as the valid, up-to-date version of the data. The obsolete version of the data X may be marked as "invalid," but may not be immediately removed (e.g., erased), since, as discussed above, erasing X may involve erasing an entire storage division, which is a time-consuming operation and may result in write amplification. Similarly, data that is no longer is use (e.g., deleted or trimmed data) may not be immediately removed. The non-volatile storage media may accumulate a significant amount of "invalid" data. A groomer process may operate outside of the "critical path" for servicing storage operations. The groomer process may reclaim storage divisions so that they can be reused for other storage operations. As used herein, reclaiming a storage division refers to erasing the storage division so that new data may be stored/programmed thereon. Reclaiming a storage division may comprise relocating valid data on the storage division to a new storage location. The groomer may identify storage divisions for reclamation based upon one or more factors, which may include, but are not limited to: the amount of invalid data in the storage division, the amount of valid data in the storage division, wear on the storage division (e.g., number of erase cycles), time since the storage division was programmed or refreshed, and so on.

The storage controller may be further configured to store data in a log format. As described above, a log format refers to a data format that defines an ordered sequence of storage operations performed on a non-volatile storage media. In some embodiments, the log format comprises storing data in a pre-determined sequence within the media address space of the non-volatile storage media (e.g., sequentially within pages and/or erase blocks of the media). The log format may further comprise associating data (e.g., each packet or data segment) with respective sequence indicators. The sequence indicators may be applied to data individually (e.g., applied to each data packet) and/or to data groupings (e.g., packets stored sequentially on a storage division, such as an erase block). In some embodiments, sequence indicators may be applied to storage divisions when the storage divisions are reclaimed (e.g., erased), as described above, and/or when the storage divisions are first used to store data.

In some embodiments the log format may comprise storing data in an "append only" paradigm. The storage controller may maintain a current append point within a media address space of the storage device. The append point may be a current storage division and/or offset within a storage division. Data may then be sequentially appended from the append point. The sequential ordering of the data, therefore, may be determined based upon the sequence indicator of the storage division of the data in combination with the sequence of the data within the storage division. Upon reaching the end of a storage division, the storage controller may identify the "next" available storage division (the next storage division that is initialized and ready to store data). The groomer may reclaim storage divisions comprising invalid, stale, and/or deleted data, to ensure that data may continue to be appended to the media log.

The log format described herein may allow valid data to be distinguished from invalid data based upon the contents of the non-volatile storage media, and independently of the storage metadata. As discussed above, invalid data may not be removed from the storage media until the storage division comprising the data is reclaimed. Therefore, multiple "versions" of data having the same context may exist on the non-volatile storage media (e.g., multiple versions of data having the same logical interface and/or same logical identifier). The sequence indicators associated with the data may be used to distinguish "invalid" versions of data from the current, up-to-date version of the data; the data that is the most recent in the log is the current version, and all previous versions may be identified as invalid.

FIG. 1A is a block diagram of one embodiment a system 100 comprising a storage management layer (SML) 130 with a hybrid checkpointed memory module 136. The SML 130 may operate on a computing device 110, which may comprise a processor 111, volatile memory 112, and a communication interface 113. The processor 111 may comprise one or more central processing units, one or more general-purpose processors, one or more application-specific processors, one or more virtual processors (e.g., the computing device 110 may be a virtual machine operating within a host), one or more processor cores, or the like. The communication interface 113 may comprise one or more network interfaces configured to communicatively couple the computing device 110 (and/or storage controller 124) to a communication network, such as an Internet Protocol network, a Storage Area Network, or the like. The computing device 110 may further comprise a non-transitory, machine-readable storage media 114. The machine-readable storage media 114 may comprise machine-executable instructions configured to cause the computing device 110 (e.g., processor 111) to perform steps of one or more of the methods disclosed herein. Alternatively, or in addition, the storage management layer 130 and/or one or more modules thereof may be embodied as one or more machine-readable instructions stored on the non-transitory storage media 114.

The storage management layer 130 may be configured to provide storage services to one or more storage clients 116. The storage clients 116 may include local storage clients 116 operating on the computing device 110 and/or remote, storage clients 116 accessible via the network (and network interface 113). The storage clients 116 may include, but are not limited to: operating systems, file systems, database applications, server applications, kernel-level processes, user-level processes, applications, and the like.

The storage management layer 130 comprises and/or is communicatively coupled to one or more storage devices 120A-N. The storage devices 120A-N may include different types of storage devices including, but not limited to: solid-state storage devices, hard drives, SAN storage resources, or the like. The storage devices 120A-N may comprise respective controllers 126A-N, non-volatile storage media 122A-N, and volatile memory 128A-N. The volatile memory 128A-N, in the depicted embodiment, is physically disposed on and collocated with each storage device 120A-N.

The SML 130, in the depicted embodiment, includes a hybrid checkpointed memory module 136 which is described in greater detail below with regard to FIG. 2. While the hybrid checkpointed memory module 136 is depicted as part of the SML 130, in other embodiments, the hybrid checkpointed memory module 136 may be integrated with a hardware controller 126 of a storage device 120, may comprise a device driver executing on the computing device 110 for a storage device 120, or may include a combination of one or more of the SML 130, a hardware controller 126 of a storage device 120, and a device driver for a storage device 120.

In general, the hybrid checkpointed memory module 136 provides the host volatile memory 112, the device volatile memory 128, and/or the non-volatile storage media 122 to the storage clients 116 as application direct memory or extended memory. For example, the hybrid checkpointed memory module 136 may dynamically swap and allocate the host volatile memory 112 of the computing device 110, the device volatile memory 128 of the storage device 120, and/or the non-volatile storage media 122 in a memory hierarchy for the one or more storage clients 116.

In one embodiment, the hybrid checkpointed memory module 136 may map a dynamically allocated memory hierarchy of the host volatile memory 112 and the non-volatile storage media 122 into a virtual memory system of the computing device 110. In another embodiment, the hybrid checkpointed memory module 136 may map a dynamically allocated memory hierarchy of the device volatile memory 128 and the non-volatile storage media 122 into a virtual memory system of the computer device 110. In a further embodiment, the hybrid checkpointed memory module 136 may map a combination of the host volatile memory 112 and the device volatile memory 128 and the non-volatile storage media 122 into a virtual memory system of the computer device 110.

A memory hierarchy provided by the hybrid checkpointed memory module 136, when mapped into a virtual memory system of the computer device 110, may be directly accessible to the storage clients 116 using volatile load/store memory access semantics. The hybrid checkpointed memory module 136, in certain embodiments, leverages the speed of volatile memory, such as the host volatile memory 112 and/or the device volatile memory 128, with the cost, power-saving, and persistence advantages of the non-volatile storage media 122, to provide a cost and power efficient hybrid memory, capable of being persistently checkpointed to the non-volatile storage media 122.

The hybrid checkpointed memory module 136, in certain embodiments, persists checkpoints of ranges of virtual memory addresses for the host volatile memory 112 and/or the device volatile memory 128 to the non-volatile storage media 122, so that the storage clients 116 may access the checkpoints across restart events for the computing device 110. A restart event, as used herein, comprises an intentional or unintentional loss of power to at least a portion of the computing device 110 and/or a storage device 120. A restart event may comprise a system reboot, reset, or shutdown event; a power fault, power loss, or power failure event; or another interruption of power. By persisting checkpoints, the hybrid checkpointed memory module 136 may allow the storage clients 116 to resume execution states, even after a restart event, may allow the storage clients 116 to persist different independent data sets, and the like.

Figure 1B:
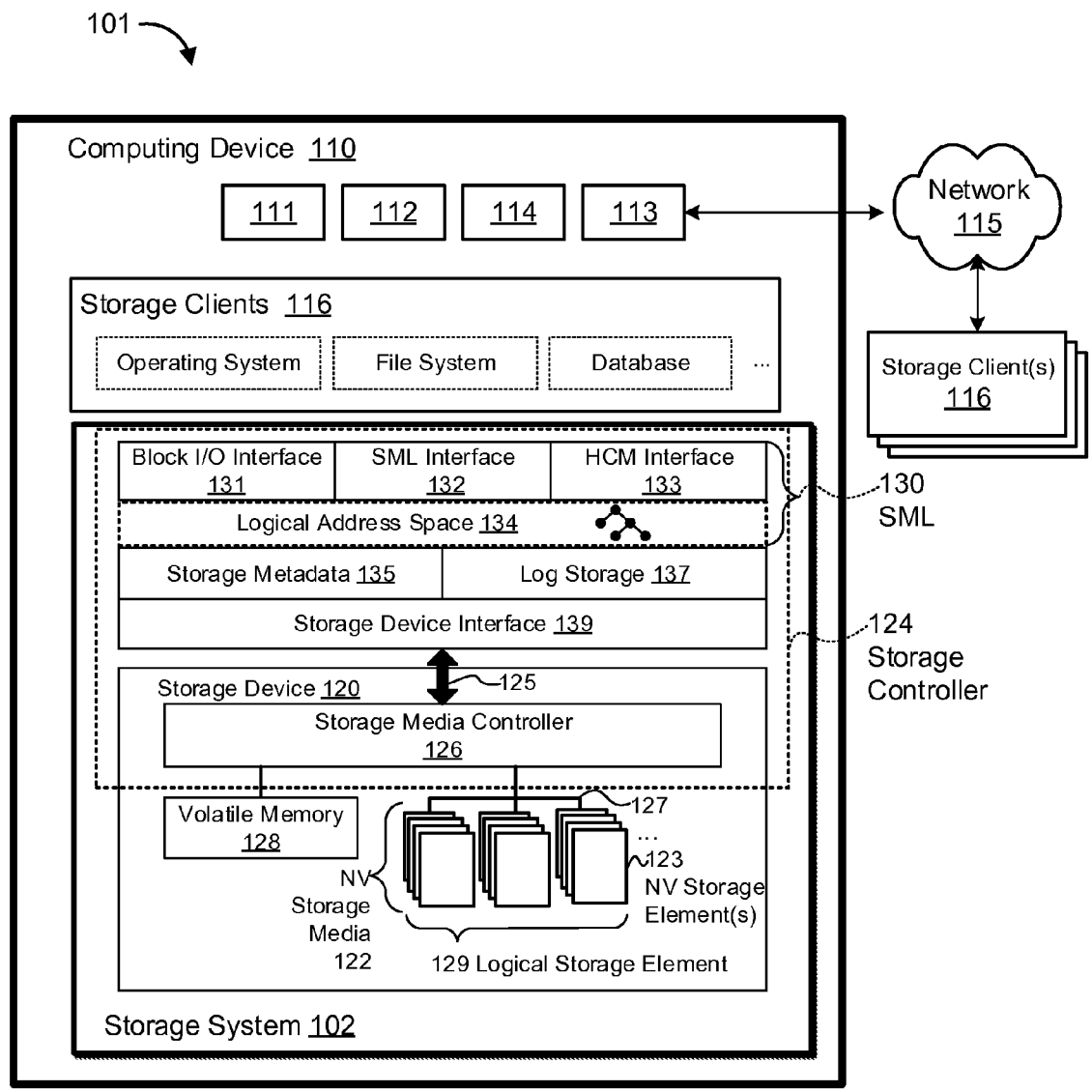
FIG. 1B is a schematic block diagram illustrating another embodiment of a system for hybrid checkpointed memory.

As illustrated in FIG. 1B, the SML 130 may provide access to the non-volatile storage devices 120A-N via a traditional block I/O interface 131. Additionally, the SML 130 may provide access to enhanced functionality (large and/or sparse virtual address space) through the SML interface 132. The SML 130 may also provide volatile memory semantic access to a memory hierarchy of the hybrid checkpointed memory module 136 and/or may provide persistent checkpointing features through the hybrid checkpointed memory interface 133. The storage metadata 135 may be used to manage and/or track storage operations performed on any of the Block I/O interface 131, SML interface 132, hybrid checkpointed memory interface 133, or other, related interfaces.

The hybrid checkpointed memory interface 133 may expose hybrid checkpointed memory specific features accessible via the SML 130 or from the hybrid checkpointed memory module 136 directly. For example, a storage client 116, in certain embodiments, may use the hybrid checkpointed memory interface 133 to request that the hybrid checkpointed memory module 136 create a checkpoint, set a checkpoint period for the hybrid checkpointed memory module 136, request that the hybrid checkpointed memory module 136 restore a checkpoint, define a range of virtual memory addresses as persistent, erase, delete, or trim a checkpoint, or the like. As used herein, creating a checkpoint comprises persisting the data associated with a given set of virtual memory addresses at a particular point in time. The hybrid checkpointed memory interface 133 may comprise a custom interface or API, industry standard interface or API, a library, one or more pre-existing system calls, a standard memory management interface, a hardware interface, or the like.

The SML 130 may provide storage services through one or more interfaces, which may include, but are not limited to: a block I/O interface, an extended storage management layer interface, a cache interface, the hybrid checkpointed memory interface 133, and the like. The SML 130 may present a logical address space 134 to the storage clients 116 through one or more interfaces. As discussed above, the logical address space 134 may comprise a plurality of logical identifiers, each corresponding to respective media storage locations on one or more of the storage devices 120A-N. The SML 130 may maintain storage metadata 135 comprising "any-to-any" mappings between logical identifiers and media storage locations, as described above. The logical address space 134 and storage metadata 135 may, therefore, define a logical interface of data stored on the storage devices 120A-N.

The SML 130 may further comprise a log storage module 137 that is configured to store data in a contextual, log format. The contextual, log data format may comprise associating data with persistent contextual metadata, such as the logical interface of the data (e.g., logical identifier), or the like. The contextual, log format may further comprise associating data with respective sequence identifiers on the non-volatile storage media 122, which define an ordered sequence of storage operations performed on the storage devices 120A-N, as described above.

The SML 130 may further comprise a storage device interface 139 configured to transfer data, commands, and/or queries to the storage devices 120A-N over a bus 125, which may include, but is not limited to: a peripheral component interconnect express ("PCI Express" or "PCIe") bus, a serial Advanced Technology Attachment ("ATA") bus, a parallel ATA bus, a small computer system interface ("SCSI"), FireWire, Fibre Channel, a Universal Serial Bus ("USB"), a PCIe Advanced Switching ("PCIe-AS") bus, a network, Infiniband, SCSI RDMA, or the like. The storage device interface 139 may communicate with the storage devices 120A-N using input-output control ("IO-CTL") command(s), IO-CTL command extension(s), remote direct memory access, or the like.

FIG. 1B is a block diagram of another embodiment a system 101 for hybrid checkpointed memory. The SML 130 may operate on a computing device 110, which, as discussed above, may comprise a processor 111, host volatile memory 112, and communication interface 113, and non-transitory, machine-readable storage media 114. The communication interface 113 may comprise one or more network interfaces configured to communicatively couple the computing device 110 (and/or storage controller 124) to a network 115 and/or to one or more remote, network-accessible storage clients 116.

The computing device 110 may comprise a storage controller 124 that is configured to provide storage services to the storage clients 116. The storage clients 116 may include local storage clients 116 operating on the computing device 110 and/or remote, storage clients 116 accessible via the network 115 (and network interface 113). The storage controller 124 comprises one or more storage devices 120. Although FIG. 1B depicts a single storage device 120, the disclosure is not limited in this regard and could be adapted to incorporate any number of storage devices 120.

The non-volatile storage device 120 may comprise non-volatile storage media 122, which may include but is not limited to: NAND flash memory, NOR flash memory, nano random access memory (NRAM), magneto-resistive RAM (MRAM), non-volatile or battery backed dynamic RAM (DRAM), phase change RAM (PRAM or PCM), Racetrack memory, Memristor memory, nanocrystal wire-based memory, silicon-oxide based sub-10 nanometer process memory, graphene memory, Silicon-Oxide-Nitride-Oxide-Silicon (SONOS), Resistive random-access memory (RRAM), programmable metallization cell (PMC), conductive-bridging RAM (CBRAM), magnetic storage media (e.g., hard disk, tape), optical storage media, or the like. The non-volatile storage media 122 may be comprised of one or more storage elements 123, which may include, but are not limited to: chips, packages, planes, die, and the like. The volatile memory 128 may comprise but is not limited to: DRAM, static RAM (SRAM), thyristor RAM (T-RAM), zero-capacitor RAM (Z-RAM), twin transistor RAM (TTRAM), or the like. While the non-volatile storage media 122 is referred to herein as "storage media," in various embodiments, the non-volatile storage media 122 may more generally comprise a non-volatile recording media capable of recording data, which may be referred to as a non-volatile memory media, a non-volatile storage media, or the like. Further, the non-volatile storage device 120, in various embodiments, may comprise a non-volatile recording device, a non-volatile memory device, a non-volatile storage device, or the like.

A storage media controller 126 may be configured to manage storage operations on the storage media 122 and/or the volatile memory 128, and may comprise one or more processors, programmable processors (e.g., field-programmable gate arrays), or the like. In some embodiments, the storage media controller 126 is configured to store data on (and read data from) the storage media 122 in the contextual, log format described above, and to transfer data to/from the non-volatile storage device 120, and so on. The storage media controller 126 may be configured to store data in a write-in-place volatile memory semantic manner to the volatile memory 128.

The storage media controller 126 may be communicatively coupled to the non-volatile storage media 122 and/or the volatile memory 128 by way of one or more buses 127. A bus 127 may comprise a storage I/O bus for communicating data to/from the non-volatile storage elements 123. The bus 127 may further comprise a control I/O bus for communicating addressing and other command and control information to the non-volatile storage elements 123. In some embodiments, the bus 127 may communicatively couple the non-volatile storage elements 123 to the storage media controller 126 in parallel. This parallel access may allow the elements 123 to be managed as a group, forming a logical storage element 129. As discussed above, the logical storage element may be partitioned into respective logical storage units (e.g., logical pages) and/or logical storage divisions (e.g., logical erase blocks). The logical storage units may be formed by logically combining physical storage units of each of the non-volatile storage elements. For example, if the solid state storage media 122 comprises twenty-five (25) non-volatile storage elements, each logical storage unit may comprise twenty-five (25) pages (a page of each of element 122).

The storage controller 124 may comprise a SML 130 and the storage media controller 126. The SML 130 may provide storage services to the storage clients 116 via one or more interfaces 131, 132, and/or 133. In some embodiments, the SML 130 provides a block-device I/O interface 131 through which storage clients 116 perform block-level I/O operations. Alternatively, or in addition, the SML 130 may provide a storage management layer (SML) interface 132, which may provide other storage services to the storage clients 116. In some embodiments, the SML interface 132 may comprise extensions to the block device interface 131 (e.g., storage clients 116 may access the SML interface 132 through extensions to the block device interface 131). Alternatively, or in addition, the SML interface 132 may be provided as a separate API, service, and/or library. The SML 130 may be further configured to provide a cache interface 133 for caching data using the non-volatile storage system 102.

As described above, the SML 130 may present a logical address space 134 to the storage clients 116 (through the interfaces 131, 132, and/or 133). The SML 130 may maintain storage metadata 135 comprising "any-to-any" mappings between logical identifiers in the logical address space 134 and media storage locations on the non-volatile storage device 120. The storage system 102 may further comprise a log storage module 137, which, as described above, may be configured to store data on the storage device 120 in a contextual, log format. The contextual, log data format may comprise associating data with a logical interface (e.g., logical identifier) on the non-volatile storage media 122. The contextual, log format may further comprise associating data with respective sequence identifiers on the non-volatile storage media 122, which define an ordered sequence of storage operations performed on the non-volatile storage media 122, as described above. The storage controller 124 may further comprise a storage device interface 139 that is configured to transfer data, commands, and/or queries to the storage media controller 126 over a bus 125, as described above.

Figure 2:
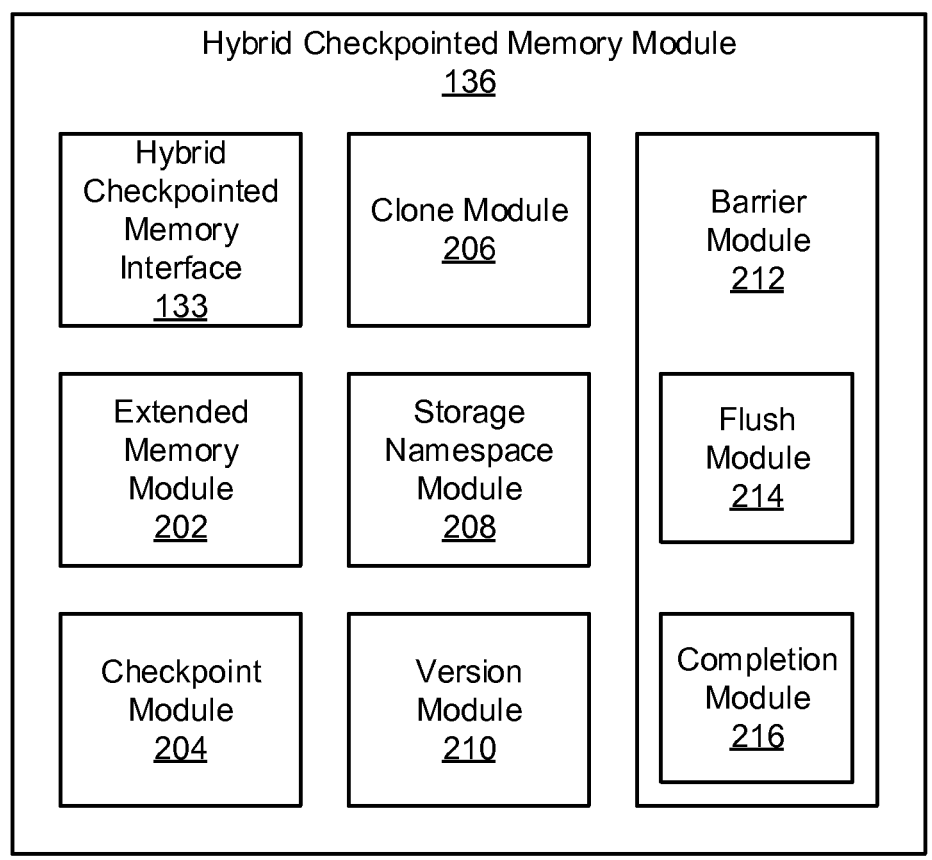
FIG. 2 is a schematic block diagram illustrating one embodiment of a hybrid checkpointed memory module.

FIG. 2 depicts one embodiment of a hybrid checkpointed memory module 136. The hybrid checkpointed memory module 136, in certain embodiments, may be substantially similar to the hybrid checkpointed memory module 136 described above with regard to FIG. 1A. In the depicted embodiment, the hybrid checkpointed memory module 136 comprises a hybrid checkpointed memory interface 133, an extended memory module 202, a checkpoint module 204, a clone module 206, a storage namespace module 208, a version module 210, and a barrier module 212. The barrier module 212, in the depicted embodiment, includes a flush module 214 and a completion module 216. In other embodiments, the hybrid checkpointed memory module 136 may comprise other combinations of one or more of the hybrid checkpointed memory interface 133, the extended memory module 202, the checkpoint module 204, the clone module 206, the storage namespace module 208, the version module 210, the barrier module 212, the flush module 214, and/or the completion module 216.

In one embodiment, the hybrid checkpointed memory interface 133 may be substantially similar to the hybrid checkpointed memory interface 133 described above with regard to FIG. 1B. For example, at least a portion of the hybrid checkpointed memory interface 133, the extended memory module 202, the checkpoint module 204, the clone module 206, the storage namespace module 208, the version module 210, the barrier module 212, the flush module 214, and/or the completion module 216 may be part of a device driver for the non-volatile storage device 120 executing on the host computing device 110 (e.g., the SML 130), part of hardware of the storage device 120 such as the storage media controller 126 (e.g., microcode of a controller, firmware of a field programmable gate array (FPGA), an application specific integrated circuit (ASIC), or other logic hardware), or may otherwise be integrated with the storage controller 124.

In one embodiment, the extended memory module 202 is configured to page, swap, or otherwise transfer data of virtual memory for the host computing device 110 between main volatile memory 112 of the host computing device 110, such as DRAM or the like, and the non-volatile storage media 122 of the non-volatile storage device 120, extending a virtual memory space for one or more storage clients 116 to the non-volatile storage device 120. The extended memory module 202 may dynamically map main volatile memory 112 of the host computing device 110 and the non-volatile storage media 122 of the non-volatile storage device 120 into virtual memory of the host computing device 110 for one or more storage clients 116, as described in greater detail below with regard to the virtual memory space 400 of FIG. 4.

In one embodiment, the extended memory module 202 manages a hierarchy of memory with multiple levels of memory media, such as the host volatile memory 112, the device volatile memory 128, the non-volatile storage media 122, a high capacity magnetic media or optical media backing store, or the like. For example, the extended memory module 202 may dynamically swap, allocate, transfer, or otherwise move data between levels of a memory hierarchy, such as the host volatile memory 112, the device volatile memory 128, the non-volatile storage media 122, or the like.

In one embodiment, the extended memory module 202 manages a memory hierarchy comprising the host volatile memory 112 and the non-volatile storage media 122. In another embodiment, the memory hierarchy of the extended memory module 202 may comprise the device volatile memory 128. The entire memory hierarchy of the extended memory module 202, in a further embodiment, may be physically disposed on a single storage device 120, comprising the device volatile memory 128 and the non-volatile storage media 122 or the like. In a further embodiment, the memory hierarchy of the extended memory module 202 may be distributed across a plurality of storage devices 120, may include a high capacity magnetic or optical backing store (not shown), or the like. In another embodiment, the memory hierarchy may include the host volatile memory 112, the device volatile memory 128, and the non-volatile storage media 122. The memory hierarchy of the extended memory module 202, in various embodiments, may be referred to as extended memory, transparent expansion of application memory (TEAM), or the like.

The extended memory module 202 may provide storage clients 116 with volatile memory semantic access to the memory hierarchy, over the hybrid checkpointed memory interface 133 or the like. In certain embodiments, the extended memory module 202 may map the memory hierarchy, such as the host volatile memory 112, the device volatile memory 128, and/or the non-volatile storage media 122, into and out of virtual memory of the computing device 110, providing storage clients 116 with virtual memory access to the memory hierarchy.

Rather than fit the entire dataset of a storage client 116 or other application exclusively in either volatile memory 112 and/or 128 such as RAM or non-volatile storage media 122 such as NAND-flash, the extended memory module 202 uses both volatile memory 112 and/or volatile memory 128 and non-volatile storage media 122 to leverage the benefits of each. This hybrid approach may avoid or minimize the cost of accessing magnetic disks or other high capacity storage devices, which in certain embodiments may be included as a lower level of the memory hierarchy below the non-volatile storage media 122 or the like. The extended memory module 202, by using a memory hierarchy, may also overcome capacity constraints, high storage capacity costs, and other limitations of using DRAM, NAND-flash, or other media individually.

The extended memory module 202, in certain embodiments, actively tiers data between volatile memory 112 and/or 128 and non-volatile storage media 122, allowing storage clients 116 to leverage the hierarchical architecture without rewrite or modification of application code specific to the extended memory module 202. In one embodiment, the extended memory module 202 may manage a hierarchy of multiple tiers or layers of memory in a manner that is transparent to the storage clients 116. In other embodiments, the extended memory module 202 may support an extended memory protocol over the hybrid checkpointed memory interface 133, with one or more extended memory specific commands or operations, for storage clients 116 that are aware of the extended memory module 202.

The extended memory module 202, in one embodiment, provides a hybrid memory that combines the access latency of volatile memory 112 and/or 128, such as DRAM, with the high storage density of non-volatile storage media 122, such as flash memory, allowing storage clients 116 to scale beyond the cost and capacity limitations of volatile memory only systems. The extended memory module 202 may allow storage clients 116 or other applications to utilize non-volatile storage media 122 such as NAND-flash as a slower form of main memory, in certain embodiments extending a single system image memory footprint up towards a 48 bit or other virtual-memory limit which may be imposed by computing devices 110.

More specifically, in various embodiments, the extended memory module 202 may provide a memory tiering system with one or more of: full transparency, such that little or no storage client modifications are needed to leverage the extended memory space of the extended memory module 202; fast and effective paging, with the extended memory module 202 leveraging application memory usage statistics to migrate hot/frequent data into volatile memory 112 and/or 128 such as DRAM and cold/infrequent data to non-volatile storage media 122 such as NAND-flash; accepting industry standard hints (e.g., madvise, mlock) to improve paging; low latency and high parallelism, the extended memory module 202 optimizing a control path for performance critical page-in operations and high concurrency to prevent serialization of paging requests among threads or the like.

Traditional operating system SWAP subsystems were not designed for efficiency, and may block an entire process, not just a faulting thread, on a page fault, effectively serializing an entire application on any memory accesses that are not found in volatile memory of the computing device 110. Similarly, SWAP subsystem software overhead can dominate even the milliseconds of random access latency on magnetic disks. This makes traditional SWAP subsystems unsuitable for non-volatile storage media 122, which may have latency access times in the tens of microseconds or the like.

In certain embodiments, the extended memory module 202 operates transparently inside an existing memory management hierarchy of the computing device 110, such that existing storage clients 116 need not be modified to make use of the volatile memory 112 and/or 128 and non-volatile storage media 122 tiers of the extended memory module 202. The extended memory module 202 may manage an entire heap of a storage client 116 to tier between volatile memory 122 such as DRAM and non-volatile storage media 122 such as NAND-flash memory. In certain embodiments, the extended memory module 202 intercepts memory allocations that occur on the heap. For example, the extended memory module 202 may wrap (via gcc's—wrap functionality or the like) the malloc, and the anonymous mmap functionalities to intercept memory allocations. This wrapper of the extended memory module 202 may then protect (via mprotect or the like) the new virtual memory pages created for the process.

The extended memory module 202, in one embodiment, handles segmentation faults that occur in response to a storage client 116 accessing a protected page. For example, the extended memory module 202 may install a custom handler for a segmentation fault by POSIX sigaction or the like. One or more segmentation fault handlers may comprise entry points into the extended memory module 202 runtime system, such that the extended memory module 202 may perform one or more page-in and page-out operations for a requesting storage client 116, as described below. The extended memory module 202, in one embodiment, detects page deletions via wrapping setbrk and munmap calls, or the like. When freeing a page, the extended memory module 202, in certain embodiments, may unprotect the freed page and mark a page table entry as unused (by using madvise or the like). If the freed page exists in the non-volatile storage media 122, the extended memory module 202 may invalidate, clear, remove, delete, trim, erase, or otherwise recover storage capacity of the page from the non-volatile storage media 122, via lazy garbage collection or another storage recovery operation as described below.

In one embodiment, the extended memory module 202 implements a page replacement policy. For example, the extended memory module 202 may dynamically and/or automatically identify pages in a working set of a storage client 116 and give the identified pages preference over other pages, storing the identified pages in the volatile memory 112 and/or 128 and storing the other pages in the non-volatile storage media 122 or the like.

For storage clients 116 to actively use the memory tiering system of the extended memory module 202, in certain embodiments, the extended memory module 202 uses a page selection algorithm to determine what pages of data are cached in the volatile memory 112 and/or 128, so that an average memory access latency for the storage clients 116 does not degrade toward that of the non-volatile storage media 122. Typically, without taking gratuitous page-faults, the only information available about volatile memory 112 and/or 128 page usage without reimplementing an epoch based scanning system, is a "referenced," "dirty," or "modified" bit contained in the operating system's or virtual memory sub-system's page table. A page table, in addition to providing a logical-to-physical mapping of virtual memory addresses to physical locations, may include one or more referenced, dirty, or modified bits for each mapping, indicating whether the associated data has been referenced, modified, updated, or the like in a predefined period of time, such as since creation, since a previous checkpoint, or the like. The referenced bit may be set whenever a page is referenced by any CPU on the system, or the like. The operating system may also periodically reset the referenced bit so that memory page usage information is updated on a regular basis. This bit is typically actively in use by the native SWAP system that chooses not to swap pages that have been recently "referenced."

Destaging, cleaning, or checkpointing data from virtual memory, as described in greater detail below, can be inefficient at a page granularity, especially for large pages such as gibibyte sized pages or the like. The extended memory module 202, in certain embodiments, may track dirty, modified, or updated data at a sub-page level, such as a byte level or the like, using a has-been-written data structure as described below.

In certain embodiments, the extended memory module 202 operates in user space entirely outside of an operating system kernel, and the extended memory module 202 may not be able to utilize pre-existing page reference information, such as a referenced bit. To expose page reference information, in one embodiment, the extended memory module 202 utilizes a dynamically loadable operating system kernel module that operates in an elevated context via a custom ioctl or the like, making the extended memory module 202 much like a user level kernel extension that performs tiering. Exposing page usage information with this thin kernel extension, in certain embodiments, allows the extended memory module 202 to maintain active pages in the volatile memory 112 and/or 128 in an unprotected state while still gathering critical reference information to make intelligent paging decisions. By using an operating system kernel extension, the extended memory module 202 may impose little or no overhead on native volatile memory accesses, making the extended memory module 202 suitable for storage clients 116 which may be dependent on high volatile memory 112 and/or 128 bandwidth.

In certain embodiments, where fine grained page usage statistics may be too expensive to implement for a large memory space or the like, the extended memory module 202 may implement a least recently used (LRU) or similar replacement algorithm to determine the pages which should be in volatile memory 112 and/or 128. For example, the extended memory module 202 may mimic a LRU behavior using just reference bits which the operating system may already maintain. The extended memory module 202, in one embodiment, may use a page-aging algorithm which promotes recently referenced pages to the head of a large first-in-first-out (FIFO) data structure while pulling old, unreferenced pages off the tail of the FIFO data structure. To implement such a scheme without having to perform a continuous scan of the pages, nor get strict FIFO behavior, in certain embodiments, the extended memory module 202 may maintain two lists of virtual memory pages that are currently resident in the volatile memory 112 and/or 128. Virtual memory pages of a storage client 116 may be referenced by one of these two lists at any point in time.

The important page list (IPL), as used herein, is the list of pages that are frequently accessed by one or more storage clients 116. The extended memory module 202, in certain embodiments, prefers to store pages from the IPL in the volatile memory 112 and/or 128, if possible. When the extended memory module 202 copies, transfers, or otherwise stores a page to the volatile memory 112 and/or 128 from the non-volatile storage media 122, the extended memory module 202 may first place the page on the important page list (IPL). In certain embodiments, it may not be easy or convenient for the extended memory module 202 to detect the usage of a page in a synchronous manner, and the extended memory module 202 may maintain the IPL list as a FIFO. When the extended memory module 202 rotates pages of the IPL, if the outgoing page's referenced bit is set, the extended memory module 202 may re-add the outgoing page to the head of the IPL and unset the outgoing page's referenced bit. If the outgoing page's referenced bit is not set, then the page was not used in that round through the IPL and the extended memory module 202 may move the outgoing page to the head of a second list called the paging candidate list (PCL).

By maintaining two lists, in certain embodiments, the extended memory module 202 has two decision points at which the extended memory module 202 may consult the referenced bit to determine page use frequency. In other embodiments, the extended memory module 202 may maintain three or more FIFO lists to decrease the granularity of the re-use pools, although maintaining just two lists may provide an acceptable performance/complexity trade-off, or the like.

A paging candidate list (PCL), as used herein, is a list of pages that the extended memory module 202 evicts from the IPL. The extended memory module 202 may also maintain the PCL in FIFO order. The extended memory module 202 may comprise a page-out engine that asynchronously cleans old pages from the tail of the PCL so that there is a small free physical page cache available with the kernel at any time for allocation when new virtual memory pages are needed by a storage client 116. If the page at the tail of the PCL has its referenced bit set, while it was aging in the PCL, the extended memory module 202 may not evict the page to the non-volatile storage media 122, but may instead keep the page in the volatile memory 112 and/or 128 and move the page back to the head of the IPL.

When the page-out engine of the extended memory module 202 finds a dirty virtual memory page at the tail of the PCL, in one embodiment, the extended memory module 202 writes the page to the non-volatile storage media 122 and deletes the page from volatile memory 112 and/or 128. For example, the extended memory module 202 may first protect the page via mprotect and then delete the page by madvise (DONT_NEED) or the like. The extended memory module 202 may simply delete pages which are not dirty and are already present in the non-volatile storage media 122.

In the degenerate case where the kernel's free list is empty, and the IPL and PCL entries all are referenced, the extended memory module 202 may effectively function as a large per-process FIFO on main memory for paging decisions. In certain embodiments, the extended memory module 202 may detect memory pressure and proactively adapt the sizes of the IPL and the PCL so that the extended memory module 202 may make intelligent decisions when storage clients 116 are competing for memory resources of the extended memory module 202.

Traditional operating systems may maintain lists similar to the IPL and PCL for physical memory pages in a computing device 110. However, SWAP cannot simply purge the tail of the lists because the operating system does not know which virtual memory page the physical page at the tail of the lists references. This is due to a lack of a reverse mapping between physical pages and virtual memory pages of each process. Thus, an operating system SWAP subsystem must typically do an expensive page table scan of processes to determine which virtual memory page has not been recently "referenced" and so can be evicted from host memory of the computing device 110.

By maintaining the IPL and PCL to contain virtual memory pages instead of physical pages, in certain embodiments, the extended memory module 202 trades mapping overhead for repetitive scanning of page tables, thereby decreasing the page-out selection time compared to an operating system SWAP sub-system. This allows the extended memory module 202 to make a O(1) paging decision, versus a O(n) paging decision for an operating system SWAP sub-system, where n is the number of active physical pages in the SWAP sub-system.

Traditional SWAP sub-systems have a software overhead that dominates the device access time even on magnetic drives where access time is typically in the milliseconds. This large overhead may negate the benefit of using NAND-flash or another non-volatile storage media as a traditional SWAP device. The extended memory module 202, in certain embodiments, may handle a userspace segmentation fault and page-out selection in a few microseconds or the like, such that the runtime overhead may be dominated by the 50 microsecond or more latency of high performance NAND-flash or other non-volatile storage media 122. With un-inhibited access to volatile memory 112 and/or 128 and low latency in the paging process, in one embodiment, the extended memory module 202 provides storage clients 116 with transparent tiering with performance that is very close to native control of the hardware volatile memory 112 and/or 128.

In one embodiment, the extended memory module 202 allows multiple threads of the storage clients 116 to simultaneously page between the volatile memory 112 and/or 128 and the non-volatile storage media 122. In modern multi-core systems, simultaneous paging may de-serialize multi-programmed storage clients 116 and allow multiple outstanding requests to the non-volatile storage media 122, allowing full bandwidth out of modern NAND-flash devices or other non-volatile storage media 122. In certain embodiments, the extended memory module 202 runtime may not stop all threads of a storage client 116 during paging, delaying only threads which are waiting on the protected virtual memory page.

Traditionally, the extended memory module 202 would need to unprotect a virtual memory address before it could load the page from the non-volatile storage media 122. However, if the extended memory module 202 unprotects the page, a thread of a storage client 116 could potentially read garbage data from the page, without faulting, now that the page is unprotected, before the data transfer from the non-volatile storage media 122 completes. In certain embodiments, the extended memory module 202 may solve this thread-safety problem by employing a driver which runs in an "elevated" context with access to a storage client's page table entries.

The extended memory module 202, in one embodiment, temporarily materializes the page from the non-volatile storage media 122 into a different virtual memory page that is not protected. The extended memory module 202 then instructs the driver to swap the physical pages of the temporary virtual memory page with the actual virtual memory page via another custom ioctl, or the like. Another thread which tries to access the virtual memory page at the user level, in the meantime, may simply fault and blocks in a segmentation fault handler. Once the extended memory module 202 completes the physical page swap, the extended memory module 202 unprotects the virtual memory page and returns control back to the application thread of the storage client 116.

While certain types of non-volatile storage media 122 are able to support high sustained write bandwidth, not all types support efficient random writes. In certain embodiments, the extended memory module 202 stores data to the non-volatile storage media 122 in a log-structured manner without assumptions about write efficiency of the underlying hardware. The extended memory module 202, in one embodiment, comprises and/or cooperates with a log-structured non-volatile storage media manager, such as the log storage module 137 described above. Hence, in log-structured embodiments, pages of storage clients 116 may have no deterministic location on the non-volatile storage media 122, as they would in typical write-in-place filesystems.

The extended memory module 202, as a log-structured writer, in one embodiment maintains the non-volatile storage media 122 using "read-modify-write" rounds in a sequential, append-only manner that separates the read operation, modify and write operations over time by using a write-out-of-place method. In each round, the extended memory module 202 may read a certain fixed number of pages from the non-volatile storage media 122 into the volatile memory 112 and/or 128 and performs garbage collection, a storage capacity recovery operation, such as erase.

The extended memory module 202, in certain embodiments, may treat one or more types of pages in the non-volatile storage media 122 as garbage. In one embodiment, a page which has a newer version of it written elsewhere (detected by using the storage metadata 135 maintained per-page in the non-volatile storage media 122 comprising a pointer to the page's extended memory table entry or the like) comprises invalid data suitable for garbage collection. In another embodiment, a page that has been freed by a storage client 116 comprises invalid data suitable for garbage collection (detected by modifying the setbrk and munmap functionalities as described above or the like). The extended memory module 202, in certain embodiments, writes remaining valid pages back to their original logical locations on the non-volatile storage media 122 while the extended memory module 202 fills storage capacity deemed as invalid garbage with any dirty data purged from the PCL. The log-structured writer of the extended memory module 202 may continue this operation asynchronously in a sequential manner as long as the extended memory module 202 evicts dirty pages from the PCL.

In certain embodiments, the extended memory module 202 translates virtual memory addresses into log-structured non-volatile storage media addresses/locations for the page-out (and/or the page-in) process as described above with regard to the logical address space 134 of the SML 130. The extended memory module 202 may translate virtual memory addresses in a space and time efficient manner. For example, the extended memory module 202 may employ four-level 64 bit page tables for converting virtual memory addresses into non-volatile storage media addresses/locations.

Employing four-level 64 bit page tables, in certain embodiments, may be particularly suited for converting virtual memory addresses into non-volatile storage media addresses/locations because as few as 40 bits for representing 4 KB granularity locations can enable the non-volatile storage media 122 to store as many as a trillion pages; because actual page table entries for a process of a storage client 116 may be used for this purpose via the same driver that provides the extended memory module 202 with read/write access to the page table entries; and/or because the hierarchical nature of the four level address translation data structure lets the extended memory module 202 runtime edit the table entries to update the non-volatile storage media address/location on the non-volatile storage media 122 or mark virtual memory pages as allocated, deallocated, volatile memory 112 and/or 128 resident, or non-volatile storage media 122 resident in an efficient manner at a low overhead.

In certain embodiments, the extended memory module 202 may provide a mechanism for a storage client 116 to provide paging hints and/or locking of data in volatile memory 112 and/or 128, via the hybrid checkpointed memory interface 133 or the like. The extended memory module 202 may implement these mechanisms using a custom interface or API, using pre-existing system calls, using an industry standard memory management interface, or the like.

In one embodiment, the extended memory module 202 intercepts an mlock function call from a storage client 116 and may lock one or more specified pages in the volatile memory 112 and/or 128 in response to the mlock function call. In another embodiment, the extended memory module 202 may intercept an madvise function call from a storage client 116 that may specify to the extended memory module 202 how the storage client 116 is going to use one or more pages in the future, or the like. In a further embodiment, the extended memory module 202 may intercept a mincore function call from a storage client 116 and may respond to the storage client 116 whether a particular page specified in the mincore function call is currently stored in the volatile memory 112 and/or 128 or in the non-volatile storage media 122. The extended memory module 202 may intercept function calls via the gcc's—wrap functionality or the like and may reinterpret the intercepted function calls in the context of extended memory, taking actions corresponding to semantics for the intercepted function calls.

Figure 4:
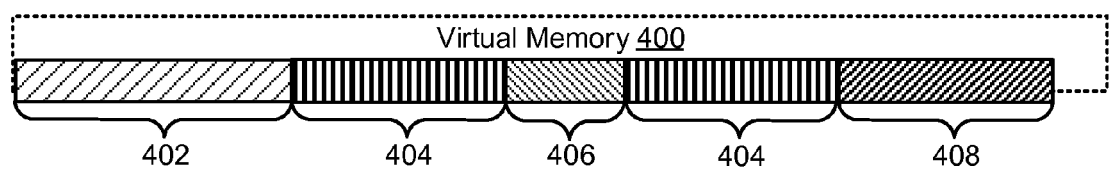
FIG. 4 depicts one embodiment of a virtual memory.

Referring briefly to FIG. 4, which depicts one embodiment of a virtual memory 400, the virtual memory 400 comprises a memory management construct of the computing device 110 and/or an associated operating system. In certain embodiments, each storage client 116 has its own virtual memory 400 and associated address space on the computing device 110. In other embodiments, multiple storage clients 116 may share a single virtual memory 400. The virtual memory 400, in one embodiment, comprises at least a subset of the logical address space 134 described above. For example, one or more ranges of LIDs of the logical address space 134 may be assigned as virtual memory addresses of the virtual memory 400 or the like. In another embodiment, addresses of the virtual memory 400 may be mapped to LIDs of the logical address space 134 using an index or other address mapping structure. In further embodiments, the extended memory module 202, the SML 130, a virtual memory sub-system, a SWAP sub-system, or the like may dynamically map and assign addresses or ranges of addresses of the virtual memory 400 to address spaces of different devices and/or media to form the virtual memory 400.

While the virtual memory 400 appears to a storage client 116 as a contiguous range of memory that behaves in a manner similar to volatile memory 112, the memory or storage that backs the virtual memory 400 may be physically distributed across different devices or media, across non-contiguous ranges of the same device or media, or the like. Because virtual memory 400 is a logical construct, a storage client 116 may still access and address the virtual memory 400 in a consistent, contiguous manner, by virtual memory address, offset within the virtual memory 400, LIDs within the virtual memory 400, or the like.

In one embodiment, the extended memory module 202 may manage the virtual memory 400 by extending the virtual memory 400 to both, or one of, host volatile memory 112 and non-volatile storage media 122, swapping or copying "infrequent" or "cold" data to the non-volatile storage media 122. In the depicted embodiment, the data logically stored in the virtual memory 400 is physically distributed between a host volatile memory 402, a device volatile memory 404, a backing store hard drive 406, and a non-volatile storage media 408.

For example, the extended memory module 202 and/or the SML 130 may dynamically allocate, swap, or page data between the host volatile memory 402, the device volatile memory 404, the backing store hard drive 406, and/or the non-volatile storage media 408 as described above. In another embodiment, a virtual memory sub-system, a SWAP sub-system, or the like of an operating system, instead of or in addition to the extended memory module 202, may swap or page data between the host volatile memory 402, the device volatile memory 404, the backing store hard drive 406, and/or the non-volatile storage media 408, or the like.

The extended memory module 202, in cooperation with the clone module 206, in certain embodiments, is configured to map multiple copies or logical clones of data, such as a file, data object, LBA range of data, or the like, into virtual memory of the host computing device 110, in response to multiple mmap commands for the same data or the like. By loading or mapping multiple copies or clones of the same data into virtual memory, the extended memory module 202 may allow multiple storage clients 116, multiple threads, or the like to access, manipulate, and/or perform transactions on the same file or other set of data, at or near the same time, which may be useful for multi-threaded applications executing on multi-core processors 111 or the like. As described below with regard to the storage namespace module 208 and/or the version module 210, each of the different clones or copies may be independently accessible or addressable, using different persistent storage namespace identifiers, different memory address ranges of virtual memory, or the like.

The extended memory module 202 and/or the clone module 206 described below, may be configured to merge updates, changes, or modifications from different clones or copies of data into a single version. For example, the extended memory module 202 and/or the clone module 206 may merge multiple clones or copies of data in response to a checkpoint trigger event so that the checkpoint module 204 may checkpoint, store, or otherwise persist the merged data to the non-volatile storage media 122 as described below. The extended memory module 202 and/or the clone module 206, in certain embodiments, may merge updates or modifications from multiple clones by resolving conflicts in the updates based on a collision detection policy for the data of the clones. Different updates conflict, in certain embodiments, if the updates are in the same location or offset in the clones, if the updates affect each other, if a storage client 116 has defined an update as a conflict, or the like. For example, if multiple storage clients 116 make updates at or near the same location, the extended memory module 202 and/or the clone module 206 may select an earliest change or modification, a most recent change or modification, a change or modification from a higher priority storage client 116, or another predefined collision detection policy for direct conflicts. In certain embodiments, an application or other storage client 116 may define a custom collision detection policy and/or conflict resolution policy for a range of data such as a file, a data object, or the like. A storage client 116, in certain embodiments, may request a merge by the extended memory module 202 and/or the clone module 206, after completing a transaction or the like, and the extended memory module 202 and/or the clone module 206 may notify a storage client 116 if a conflict occurs and how the conflict was resolved, so that the storage client 116 can rollback an update, retry an update, or otherwise handle or react to the conflict.

While paging, swapping, transferring, or otherwise managing the use of volatile 112, 128 and non-volatile 122 media for a range of virtual memory, the extended memory module 202 may track or otherwise determine which data of a range of virtual memory is not yet stored by the non-volatile storage media 122 (e.g., which data is new, which data has been modified, which data has been written, which data has been updated, which data is just in volatile memory 112, 128, or the like). In one embodiment, the extended memory module 202 determines which data is not yet stored in the non-volatile storage media 122 based on metadata in a page table, such as "referenced," "dirty," or "modified" bits, allowing the extended memory module 202 to locate dirty pages.

In a further embodiment, the extended memory module 202 may maintain one or more has-been-written data structures, such as a bitmap, bitmask, bit field, table, vector, or the like, tracking data that has been written since a previous checkpoint or other predefined time period at a sub-page granularity, such as a byte granularity, an error correcting code (ECC) chunk or block granularity, or the like. A has-been-written data structure, in certain embodiments, may allow the extended memory module 202, the checkpoint module 204, or the like to determine what data within a page is dirty and not stored by the non-volatile storage media 122, if there are holes in a range of data due to out-of-order delivery, or the like.

The extended memory module 202, in certain embodiments, provides access to a has-been-written data structure using memory access (e.g., load/store semantics), provides a "clear-all" byte to clear a set of has-been-written bits at once, or the like. The extended memory module 202 may clear or reset has-been-written metadata from a has-been-written data structure in response to the checkpoint module 204 destaging, flushing, or otherwise copying the data to the non-volatile storage media 122, as described below. The checkpoint module 204, in one embodiment, may use a has-been-written data structure stored in volatile memory 112, 128 to locate data to destage or flush to the non-volatile storage media 122 without accessing or reading the non-volatile storage media 122, preventing an extra read-modify-write operation or the like.

In certain embodiments, the extended memory module 202 provides storage clients 116 with access to a has-been-written data structure. For example, instead of requiring a storage client 116 to update a length or size of a file using a file system write( ) command, the file system may determine a new length for a file based on the has-been-written data structure. The extended memory module 202 may implement the has-been-written data structure as part of the block layer (e.g., the logical address space 134) of the non-volatile storage device 120 or as part of another namespace for the non-volatile storage device 120, such as an object based namespace or the like. For example, each bit in a has-been-written bitmap may represent one byte of a block, or the like. The extended memory module 202 may make has-been-written metadata memory mappable, allowing an application or other storage client 116 to read/write bits or other indicators in the metadata as the corresponding bytes of the block are written.

The extended memory module 202, in one embodiment, maintains the has-been-written data structure such that it parallels every byte of virtual memory with a corresponding bit that automatically indicates which bytes have indeed had data "stored" to them, been written, been modified, been updated, or the like.

In certain embodiments, a CPU 111 may not guarantee that data flushed from a CPU cache reaches a destination device, such as the non-volatile storage device 120, and a has-been-written data structure may be used to verify and/or guarantee that the non-volatile storage device 120 or other destination device receives and/or processes the flushed data. In one embodiment, the extended memory module 202, the SML 130, or the like may provide a has-been-written API. The has-been-written API, in one embodiment, includes a command to clear or zero-out the has-been-written bitmask. For example, a storage client 116, prior to requesting a CPU 111 cache flush, may clear one or more has-been-written data structures associated with the data to be flushed. The SML 130, the extended memory module 202, or the like, in certain embodiments, automatically updates the one or more has-been-written data structures at a bit level as the non-volatile storage device 120 receives and/or processes data. The has-been-written API, in a further embodiment, includes a command to read a has-been-written data structure. In response to a CPU 111 cache flush completing, a requesting storage client 116, in one embodiment, may read one or more has-been-written data structures associated with flushed data to determine whether the non-volatile storage device 120 successfully received and/or processed the flushed data. A storage client 116, in another embodiment, may monitor a has-been-written data structure to determine when a CPU 111 cache flush has successfully completed.

In certain embodiments, the extended memory module 202 and/or the SML 130 may provide one or more has-been-written data structures as part of a persistent storage namespace itself, such as a filesystem namespace, a logical unit number (LUN) namespace, or the like. For example, the extended memory module 202 and/or the SML 130 may provide a has-been-written data structure as a "shadow file" or the like that is designated to contain the bitmask of another file. Storage clients 116 may perform MMIO writes or other operations for both of these files or pages. In another embodiment, a has-been-written data structure may be interleaved within the data it represents, such as a 512 byte bitmask interleaved after each 4 kibibyte block within the same file, or the like.

One benefit of having has-been-written metadata stored within the same file or in a parallel file is that the storage client 116 need not get expressly involved in crash recovery to determine what data of a virtual memory range was just stored in volatile memory 112, 128 and what data had been written to the non-volatile storage media. A storage client 116 and/or a recovery process can just read the has-been-written data structure to determine the last data written or another state for the data. A storage client 116 can determine the end of a sequential log—even a rotating log—by looking for the first "unwritten" byte, can verify that records are complete (even if they are written out-of-order), or the like.

The extended memory module 202 and/or the checkpoint module 204 may use one or more has-been-written data structures to determine which data is dirty in volatile memory 112, 128 at a sub-page and/or per-byte granularity. In this manner, the extended memory module 202 may manage, transfer, and/or swap data at a sub-page or byte-level granularity, the checkpoint module 204 may checkpoint or destage dirty data not yet stored by the non-volatile storage media 122 at a sub-page or byte-level granularity, even if the operating system or virtual memory sub-system only tracks referenced, modified, or dirty data at a page level.

Returning to FIG. 2, the checkpoint module 204 persists data of storage client's 116 virtual memory 400. The data, in certain embodiments, may reside solely in host volatile memory 112. In other embodiments, the data may reside in multiple locations as described above with regard to the extended memory module 202, such as host volatile memory 112, device volatile memory 128, the non-volatile storage media 122, machine-readable storage media 114, a backing store, or the like. In embodiments where virtual memory 400 of a storage client 116 is managed by a virtual memory sub-system, a SWAP sub-system, or the like of an operating system, instead of or in addition to the extended memory module 202, portions of the data of a storage client's 116 virtual memory 400 may have been paged out or swapped out to a machine-readable storage media 114 of the computing device 110, such as a hard drive or the like. The checkpoint module 204, in certain embodiments, copies a checkpoint of a storage client's 116 virtual memory 400 (or a selected subset of the virtual memory 400) regardless of the location(s) of the data.

In various embodiments, the checkpoint module 204 persists data by copying, destaging, cloning, moving, flushing, or otherwise storing data of a range of virtual memory 400 from the volatile memory 112 and/or 128 to the non-volatile storage media 122. In certain embodiments, the checkpoint module 204 copies, destages, flushes, and/or moves only data of a range of virtual memory 400 that has not already been stored in the non-volatile storage media 122, referred to as dirty data, such that the entire range of virtual memory 400 is stored in the non-volatile storage media 122. The non-volatile storage media 122 may already store certain data of a range of virtual memory 400 if the extended memory module 202 has copied, paged, or swapped the data to the non-volatile storage media 122, if a valid version of the data from a previous write request is still present in the log-based append-only writing structure of the non-volatile storage media 122, if a virtual memory sub-system or SWAP sub-system has paged or swapped the data to the non-volatile storage media 122, or the like. The storage client 116 that owns the virtual memory range may not be aware that the non-volatile storage media 122 already stores a portion of the associated data, as the location at which the extended memory module 202 or another virtual memory sub-system stores data is typically transparent to (not shared with) the storage client 116.

In one embodiment, the checkpoint module 204 is configured to checkpoint, destage, persist, flush, copy, or otherwise write dirty data of virtual memory 400 or of a virtual memory range (e.g., data not yet stored by the non-volatile storage medium 122) to the non-volatile storage medium 122 in response to a checkpoint trigger event or the like, such as a checkpoint request for the data. Checkpointing data or performing a checkpoint operation for data saves or preserves a current state of the data, even after a restart event. In one embodiment, checkpointing data or performing a checkpoint operation, may comprise writing the data (or a dirty portion of the data) to the non-volatile storage medium 122 to preserve or store the data. Checkpointing data or performing a checkpoint operation, in another embodiment, may comprise cloning, copying, or referencing a portion of the data already stored in the non-volatile storage medium. In a further embodiment, checkpointing data or performing a checkpoint operation for the data may comprise a combination of both writing dirty data to the non-volatile storage medium 122 and cloning, copying, or referencing data already stored in the non-volatile storage medium 122 to form a complete clone or snapshot without unnecessarily duplicating portions of the data that are already preserved.

The checkpoint module 204 may cooperate with the extended memory module 202 as described above to determine which data is dirty and not yet stored by the non-volatile storage media 122, using a page file, has-been-written metadata, or the like. The checkpoint module 204, in one embodiment, checkpoints data in cooperation with the clone module 206, by logically cloning or otherwise referencing data from a range of virtual memory 400 that is already stored by the non-volatile memory media 122, and flushing, destaging, or otherwise writing the remaining data that is not yet stored by the non-volatile storage media 122 to the non-volatile storage media 122 (e.g., to an append point of a sequential log) to complete the checkpoint or snapshot. Together, the cloned or referenced data and the flushed or destaged data form a checkpoint or snapshot of the entire range of virtual memory 400.

The checkpoint module 204 and/or the clone module 206, in one embodiment, clones or otherwise references data of a range of virtual memory 400 that the non-volatile storage media 122 already stores to minimize or eliminate copying or moving of already stored data. By simply manipulating one or more addresses for already stored data to create a clone that references or points to the existing data as described below with regard to the clone module 206, instead of copying the data on a bus 125 or over a data network 115, the checkpoint module 204 can increase the speed at which a checkpoint may be saved or persisted. The increased checkpointing speed and decreased bus 125 and/or network traffic may be particularly apparent in environments with multiple storage clients 116, especially clusters of storage clients 116 that request checkpoints often or in a synchronized manner. The log-based structure in which the non-volatile storage media 122 stores data, in certain embodiments, may also increase the speed and ease with which a storage client 116 may save a checkpoint, as the checkpoint module 204 may simply append dirty data from a virtual memory range to an append point of the log-based structure. The index or address mapping structure of the logical address space 134, in a further embodiment, allows efficient cloning of data already stored in the non-volatile storage media 122, as multiple logical addresses may map to the same media address as described below with regard to the clone module 206.

In one embodiment, the checkpoint module 204 cooperates with or otherwise uses the clone module 206 to persist data of a range of virtual memory 400 without recopying or moving data of the address range of virtual memory 400 that the non-volatile storage media 122 already stores. The checkpoint module 204, in certain embodiments, copies data of a range of virtual memory 400 from the volatile memory 112 and/or 128 substantially simultaneously with cloning data of the range from the non-volatile storage media 122. Cloning data already stored in non-volatile storage media 122 as part of a persistent checkpoint operation may be particularly efficient in embodiments with an array of storage devices 120A-N, embodiments with a cluster of multiple nodes, embodiments with multiple storage clients 116, or other embodiments with multiple persistent checkpoint operations, simultaneous persistent checkpoint operations, or the like as described above, so that the cloned data is not sent over a storage bus 125 or data network 115 to save a checkpoint.

The checkpoint module 204 may communicate with or otherwise cooperate with the extended memory module 202 to determine which data in a range of virtual memory 400 is already stored in the non-volatile storage media 122 and which data in the range of virtual memory 400 is stored just in the volatile memory 112 and/or 128, so that the checkpoint module 204 may persist the data from the volatile memory 112 and/or 128 to the non-volatile storage media 122. For example, the checkpoint module 204 may cooperate with the extended memory module 202 to access or examine one or more page tables, one or more has-been-written data structures, or the like.

The persisted data may comprise a checkpoint, a snapshot, a clone, a copy, or the like of data of the address range of virtual memory 400 stored in the non-volatile storage media 122. As described below with regard to the storage namespace module 208, the checkpoint module 204 may persist an address range of data to a location/media address of the non-volatile storage media 122 that is associated with a persistent storage namespace identifier, so that a storage client 116 may access the persisted data, even after a restart event or the like, using the persistent storage namespace identifier for the persisted data.

The checkpoint module 204 persists data of an address range of virtual memory 400, such as the extended memory described above or the like, in response to a checkpoint trigger event. The checkpoint trigger event, in one embodiment, comprises the checkpoint module 204 receiving a checkpoint request from a storage client 116, receiving a persist request from a storage client 116, or the like. A checkpoint request or snapshot request, as used herein, is a request from a storage client 116 to persist a current state of an address range of virtual memory 400 by performing a checkpoint or snapshot operation. A persist request, as used herein, is a request from a storage client 116 labeling an address range of virtual memory 400 as persistent and associating the address range with a persistent storage namespace identifier such as a filename, a LUN identifier, or the like. One example of a persist request is an mmap request (or a custom persistent or transactional mmap request supported by the hybrid checkpointed memory interface) to map a file or device into virtual memory as described above. A storage client 116, in one embodiment, may begin with a file mapped into traditional virtual memory backed by volatile memory 112, and may mark or label the range of virtual memory persistent using a persist request. In a further embodiment, a storage client 116 may use a persist request to map a file or other data into virtual memory backed by the non-volatile storage media 122. The checkpoint module 204, in certain embodiments, receives checkpoint requests, persist requests, and the like from storage clients 116 over the hybrid checkpointed memory interface 133 described above.

In one embodiment, a checkpoint request comprises an identifier of an address range of virtual memory 400 for the checkpoint module 204 to persist. In other embodiments, a checkpoint request may indicate that the checkpoint module 204 is to persist the entire virtual memory 400 of the extended memory module 202 to the non-volatile storage media 122, persist the entire virtual memory 400 associated with a requesting storage client 116, or the like. In one embodiment, the checkpoint module 204 supports and services checkpoint requests identifying a contiguous address range of virtual memory 400, such as beginning and ending virtual memory addresses, a beginning virtual memory address and a range length, or the like. A virtual memory address may comprise any identifier that uniquely identifies data within the virtual memory 400 of a storage client 116, and may generally be referred to as a logical interface of the data or logical identifier (LID) of the data as described above. A virtual memory address may comprise one or more of a logical identifier, a file name, an object id, a label, a unique identifier, a reference to other data, a relative position or offset of data with respect to other data, a data size and/or range, or the like.

In another embodiment, the checkpoint module 204 may support and service checkpoint requests identifying a non-contiguous address range of virtual memory 400, multiple address ranges of virtual memory 400, or the like. For example, the checkpoint module 204 may support multiple beginning and ending virtual memory addresses, multiple beginning virtual memory addresses and range lengths, or the like in a single checkpoint request.

The checkpoint trigger event, in another embodiment, comprises a predetermined amount of time passing since the checkpoint module 204 has persisted a range of virtual memory 400, so that the checkpoint module 204 persists the range of virtual memory 400 periodically. In certain embodiments, a storage client 116 may specify the predetermined amount of time or time period at which the checkpoint module 204 is to checkpoint a range of virtual memory 400, in a periodic checkpoint request or the like. In a further embodiment, the checkpoint trigger event may comprise a detected restart event for the computing device 110, such as a system reboot, reset, or shutdown event; a power fault, power loss, or power failure event; or another interruption of power as described above.

The checkpoint module 204, in one embodiment, locks an address range of virtual memory 400 in response to a checkpoint trigger event, at least until the checkpoint module 204 has completed persisting the address range of virtual memory 400. For example, the checkpoint module 204 may block or stall a storage client 116 until the checkpoint operation is complete. In a further embodiment, to allow storage clients 116 to continue to read and write to an address range of virtual memory 400 during a persistent checkpoint operation, the checkpoint module 204 may perform a copy-on-write operation in response to a write request within the range of virtual memory 400 during the persistent checkpoint operation, or otherwise use a copy or clone of the data to provide write access to the data during the operation.

For example, the checkpoint module 204 may declare pages of a virtual memory address range as read-only in response to a checkpoint trigger event for the virtual memory address range. If a storage client 116 sends a storage request such as a write request for a LID within the virtual memory address range during the persistent checkpoint operation, the write request may cause an error or fault that the checkpoint module 204 may receive. In response to the write request and/or a corresponding error or fault during the persistent checkpoint operation for the virtual memory address range, the checkpoint module 204 may allow the requesting storage client 116 to write to the virtual memory address range by making a temporary copy (which may be in host volatile memory 112) of one or more pages of the virtual memory address range associated with the write request, and executing or fulfilling the write request on the copy of the one or more pages while destaging, flushing, copying, or otherwise writing dirty data from the virtual address range to the non-volatile medium 122.

Making a temporary copy of read-only or locked pages allows a write request to complete, even during a checkpoint operation for the same address range of virtual memory 400. Once the write request executes, in one embodiment, the checkpoint module 204 may use the written data to complete the checkpoint, so that the checkpoint includes the written data, by merging clones and/or copies as described below with regard to the clone module 206 or the like. In other embodiments, the checkpoint module 204 may complete the checkpoint operation without the data of the write request, so that the checkpoint does not include the data of the write request, and the data of the write request may be flushed to the non-volatile storage media 122 and included in a subsequent checkpoint in response to a subsequent checkpoint trigger event. Completing an interrupted checkpoint operation without data of the interrupting write request may more accurately preserve an order of operations or the like.

In one embodiment, the checkpoint module 204, in response to a checkpoint trigger event, in response to a storage request during a checkpoint operation, or the like, may clone or copy a range of virtual memory 400. The checkpoint module 204 may destage, flush, or checkpoint the original data while letting the storage request execute on the clone or may destage, flush, or checkpoint the clone while letting the storage request execute on the original data. In a further embodiment, instead of using a clone or temporary copy of data to service a write request during a checkpoint operation, the checkpoint module 204 may bypass volatile memory 112, 128 and write data of the write request (e.g., just the deltas, changes, or updates) to the non-volatile storage media 122, where the checkpoint module 204 may include the data in a checkpoint, a clone, or the like.

A clone, therefore, may include data stored in the non-volatile storage media 122 (e.g., so that the data is not copied again, unnecessarily using storage capacity of the non-volatile storage device 120), data stored in volatile memory 112, 128 (e.g., to service write requests during a checkpoint operation), or a combination of both data stored in the non-volatile storage media 122 and volatile memory 112, 128 (e.g., cloned to a different location in volatile memory 112, 128 to service write requests or the like). The checkpoint module 204, in cooperation with the clone module 206, may merge a clone with the original range of virtual memory or the like in response to completing a checkpoint operation, or may continue to use the clone to service storage requests until a subsequent checkpoint trigger event or the like, at which time the checkpoint module 204 may flush, destage, and/or merge changes or updates to the non-volatile storage media 122 as described above.

A checkpoint or snapshot, in certain embodiments, may be accurate or up-to-date at the time of the checkpoint trigger event, but may be allowed to become outdated or out-of-synch between checkpoint trigger events. The checkpoint module 204 may not guarantee that changes to an address range of virtual memory 400 will be persisted or checkpointed between checkpoint trigger events, and such changes may be lost in response to a restart event or the like.

For example, in one embodiment, the checkpoint module 204, the hybrid checkpointed memory interface 133, the extended memory module 202, and/or the storage namespace module 208 may cooperate to provide access exclusively to the flushed, destaged, and/or checkpointed versions of data, so that access to the data transitions atomically between consistent states for the data that are preserved at each checkpoint trigger event. In a further embodiment, the checkpoint module 204 and/or the clone module 206 may automatically delete or remove one or more clones or other potentially inconsistent versions for data that exist after a restart event, to prevent storage clients 116 from accessing an inconsistent state of the data. In this manner, in certain embodiments, storage clients 116 may have access to a single, valid, consistent version of data (e.g., a file, a data object, a range of logical addresses) that progresses from consistent state to consistent state, while inconsistent states are masked or blocked. By mapping the data into the virtual memory 400 multiple times and merging changes, as described above, multiple processes, storage clients 116, or the like, may also access the single, consistent version of the data.

As used herein, data has a consistent state when all changes, updates, or modifications for the data as of a predetermined point in time have been applied to the data. Data has an inconsistent state, as used herein, when one or more changes, updates, or modifications for the data as of a predetermined point in time have not been applied to the data, have been applied out of order, or the like. As described below with regard to the barrier module 212, data may have an inconsistent state due to asynchronous or lazy destaging from a processor cache of the processor 112 or the like. In certain embodiments, the checkpoint module 204 cooperates with the barrier module 212 to perform a flush and/or barrier operation prior to a checkpoint operation, to ensure that the checkpointed data is consistent, and all data has been flushed from the processor cache of the processor 112 prior to the checkpoint operation.

By ensuring consistency of each checkpoint, automatically deleting clones after a restart event, and/or providing storage clients 116 only with access to consistent checkpoint versions of data, in one embodiment, the hybrid checkpointed memory module 136 may provide transactional or reliable memory mapping of files or other data objects into virtual memory, an operation which may be referred to as a "transactional mmap" operation or the like. In other embodiments, certain storage clients 116 may receive access to multiple versions of data, even inconsistent versions, as described below with regard to the storage namespace module 208 and/or the version module 210. For example, certain storage clients 116 may be configured to perform their own data recovery after a restart event, and may be able to use incomplete or inconsistent versions of their data. The hybrid checkpointed memory interface 133, in certain embodiments, may provide a separate interface, command, function call, shared library, or the like for transactional mmap and may provide a different interface, command, function call, shared library, or the like for storage clients 116 to access potentially inconsistent data.

The checkpoint module 204, in a further embodiment, loads or maps a checkpoint back into the virtual memory 400 of the computing device 110 in response to a load checkpoint request from a storage client 116, over the hybrid checkpointed memory interface 133 or the like. The checkpoint module 204, in loading and/or mapping a checkpoint, in one embodiment, copies the data associate with the checkpoint back to the volatile memory 112 and/or 128. In another embodiment, the checkpoint module 204 may map a checkpoint directly from the non-volatile storage media 122 into the virtual memory 400 of the computing device 110. In other embodiments, the checkpoint module 204 may cooperate with the extended memory module 202 to dynamically load, copy, and/or distribute a loaded checkpoint into a virtual memory 400 of the computing device 110 from a combination of both the volatile memory 112 and/or 128 and the non-volatile storage media 122, or the like. For example, the checkpoint module 204 may initially map a checkpoint from the non-volatile storage media 122 into virtual memory 400 of the computing device 110, and the extended memory module 202 may copy certain "hot" or "frequent" portions of the checkpoint into volatile memory 112 and/or 128 dynamically over time, making a checkpoint load very fast and efficient as little or no data is initially transferred from non-volatile storage media 122 into volatile memory 112.

In one embodiment, the clone module 206 cooperates with the checkpoint module 204 to leverage the logical address space 134 to manage "logical copies" of data (e.g., clones) that the checkpoint module 204 persists, so that the checkpoint module 204, in certain embodiments, may not copy or rewrite data that the non-volatile storage media 122 already stores. As used herein, a copy or clone may refer to replicating data of an address range (or set of address ranges) within the logical address space 134, which may comprise or be mapped into a virtual address space of the computing device 110, without physically copying the associated data. In other embodiments, the clone module 206 may clone or copy data by physically copying the data to a different physical location. For example, to clone data from the non-volatile storage media 122 to volatile memory 112, 128, the clone module 206 may physically copy the data, so that the data may be write accessible during a checkpoint operation while the checkpoint module 204 destages or flushes dirty data as described above. Whether or not the clone module 206 physically copies data to create a clone, from the perspective of a storage client 116, a clone comprises a logical and/or physical copy of data, such as a file, a data object, a data segment, or the like.

The clone module 206 may assign a clone a different LID, but the clone may be bound to or reference the same media storage locations, allowing two or more different LIDs (e.g., logical block addresses (LBAs), virtual memory addresses) to reference the same data. For example, data at a media storage location may be assigned LIDs mapped into virtual memory 400 of the computing device 110, and in response to a checkpoint operation for the data, the clone module 206 may assign the data additional LIDs associated with a persistent storage namespace such as a filename, a logical unit number (LUN) name, a LUN identifier, a LUN address, or the like. The different LIDs may be used separately and independently to access and manipulate the associated data. As soon as one of the LIDs is used to change the data, in one embodiment, the different LIDs cease to be clones, and the clone module 206 assigns one version of the data to a different media storage location, writing the data to an append point or the like. At that point, the original data and the clone have forked or diverged and become different versions.

In the checkpointing context, in certain embodiments, the storage client 116 associated with a virtual memory address range and a checkpoint may manage or have access to both different LIDs (original LIDS and those assigned in the clone) of a set of clones. In another embodiment, the hybrid checkpointed memory module 136, the SML 130, or the like may own or control access to the LIDs associated with a checkpoint operation. In one embodiment, the logical address space 134 of the storage device 120 may be divided into address ranges for specific purposes or functions, such as a logical address range associated with checkpoint operations, or the like. Logical copies may be useful for de-duplication, checkpoints or snapshots, atomic operations (e.g., atomic writes, transactions), and the like.

Creating a clone may comprise updating the logical interface of data stored on the non-volatile storage media 122; the modification may comprise referencing the data by two (or more) LIDs (or LID ranges) as opposed to a single LID (or LID range). As such, creating a clone of a LID (or set or range of LIDs) may comprise allocating new LIDs in the logical address space 134 (or dedicated portion thereof such as a logical address range reserved for use in completing checkpoint operations), and binding the new LIDs to the same media storage locations as the original LIDs.

Figure 3A:
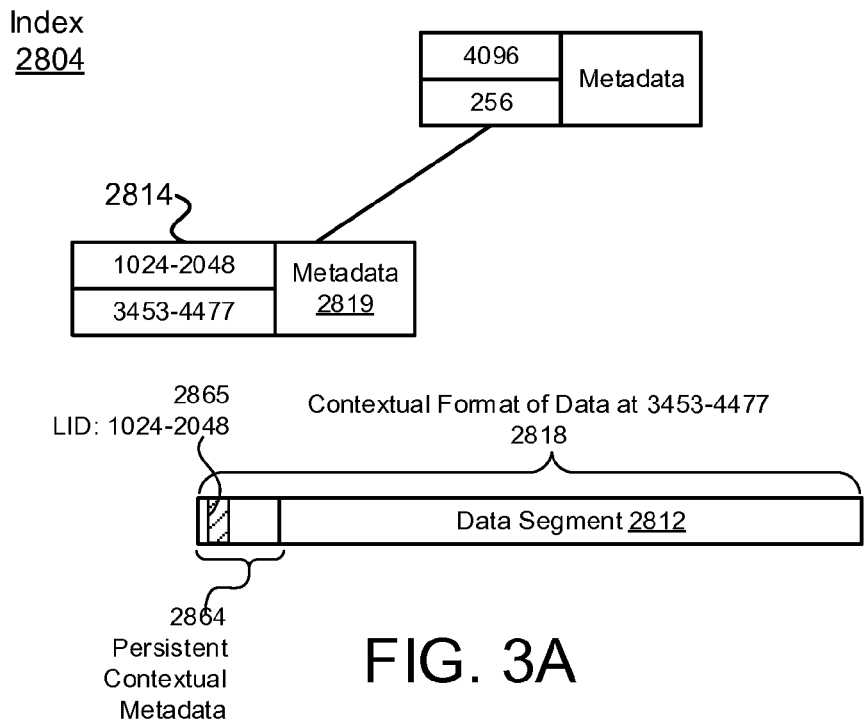
FIG. 3A depicts one embodiment of storage metadata for managing a clone of data in a contextual format.

FIG. 3A depicts one example of a clone operation of the clone module 206. The clone module 206 may implement a clone operation in response to a request from a storage client 116 and/or as part of a higher-level API provided by the SML 130, such as a checkpoint operation, an atomic operation, snapshot, transaction, or the like. FIG. 3A depicts the index 2804 before the clone module 206 creates a clone. The index 2804 comprises an entry 2814 that binds LIDs 1024-2048 to media storage locations 3453-4477. The contextual format of the data at the media storage locations 3453-4477 is also depicted; in the FIG. 3A example, the contextual format comprises a packet format 2818 on the non-volatile storage media 122, which comprises persistent contextual metadata 2864. The persistent contextual metadata 2864 comprises a logical interface to the data segment 2812 (logical interface metadata 2865). The logical interface metadata 2865 indicates that the data segment 2812 pertains to LIDs 1024-2048. In certain embodiments, the contextual data format 2818 may allow the index 2804 to be reconstructed. The entry 2814 in the index 2804 may be reconstructed by associating the data at media address 3453-4477 with the corresponding logical identifiers (LID 1024-2048) in the persistent contextual metadata of the packet 2818. Although FIG. 3A depicts a single packet 2818, the disclosure is not limited in this regard. In some embodiments, the data of the entry 2814 may be stored in multiple, different packets 2818, each comprising respective persistent contextual metadata 2864 (e.g., a separate packet for each media storage location, etc.).

Figure 3B:
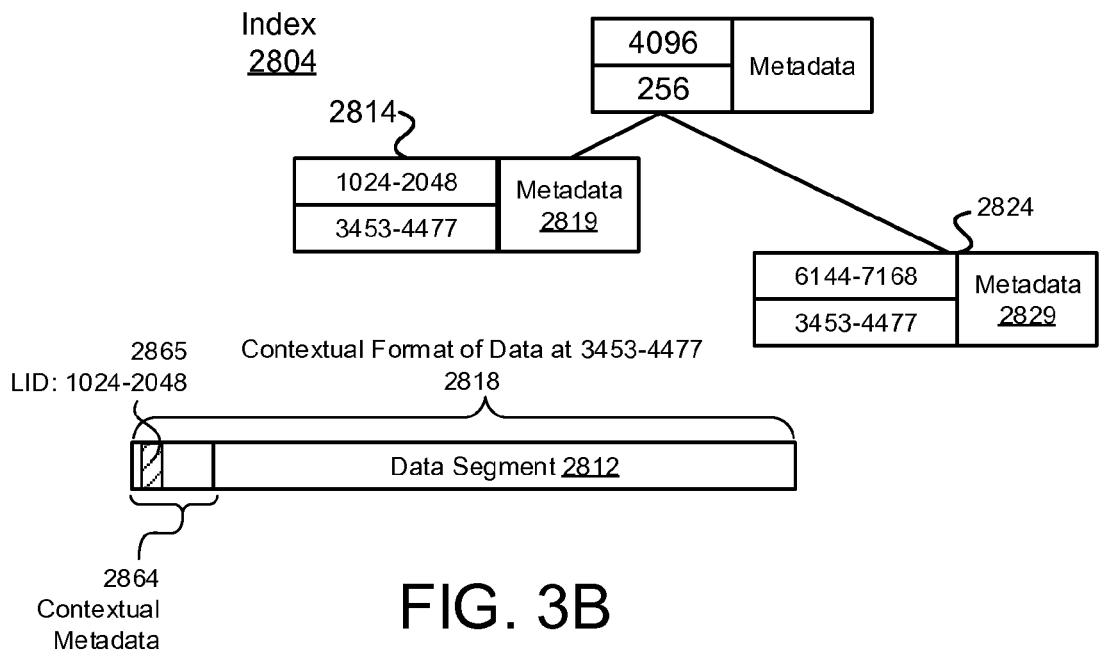
FIG. 3B-F depict embodiments of clone operations.

The clone module 206 may create a clone of the entry 2814 by allocating one or more LIDs in the logical address space 134, and binding the new LIDs to the same data segment 2812 as the entry 2814 (e.g., the data segment at media storage location 3453-4477). The clone module 206 may, therefore, modify the logical interface of the data segment 2812; rather than being bound to only a single range of LIDs (1024-2048), the modified logical interface binds the data segment 2812 to multiple, different LIDs (1024-2048 and 6144-7168). FIG. 3B depicts the index 2804 comprising the modified logical interface of the data segment 2812. Modifying the logical interface of the data segment 2812, in certain embodiments, may be performed by the clone module 206 dynamically at runtime, and may be a dynamic, fast alteration to the index 2804 in volatile memory.

In the FIG. 3B example, the index 2804 comprises a new entry 2824 to represent the clone. The clone may be assigned LIDs 6144-7168. The new entry 2824 may be bound to the same media storage location as entry 2814 (media storage locations 3453-4477), in response to a checkpoint operation for a memory range including the entry 2814. The clone results in the clone module 206 modifying the logical interface of the data segment 2812; the logical interface of the data segment 2812 includes 1024-2048 and 6144-7168 (entries 2814 and 2824). The modified logical interface provides for accessing the data segment 2812 through either LIDs 1024-2048 or 6144-7168, as opposed to only LIDs 1024-2048, allowing a storage client 116 to continue to perform write operations using LIDs 1024-2048 which may be mapped into virtual memory 400, while LIDs 6144-7168 of entry 2824 may identify a checkpoint clone of the data segment 2812.

The modified logical interface of the clone is inconsistent with the contextual format of the data segment 2812 on the non-volatile storage media 122. As described above, the persistent contextual metadata 2864 of the data segment 2812 comprises logical interface metadata 2865 that associates the data segment 2812 with only LIDs 1024-2048, not LIDs 1024-2048 and 6144-7168. In certain embodiments, the contextual format of the data 2818 may need to be updated to be consistent with the modified logical interface (e.g., updated to associate the data with LIDs X and Y, as opposed to only X).

The clone module 206 updating the contextual format of the data may comprise the clone module 206 updating the persistent contextual metadata 2864 of the contextual data format on the non-volatile storage media 122. Due to the append only, write out-of-place properties of a log maintained by the SML 130 and/or the hybrid checkpointed memory interface 133, updating the contextual format of the data segment 2812 may comprise relocating the data segment 2812 to a new storage location on the non-volatile storage media 122, which may be a time-consuming processes; this may be particularly inefficient if the data segment 2812 is large and/or the clone comprises a large number and/or range of LIDs.

Therefore, in some embodiments, the SML 130 and/or the clone module 206 may defer updating the contextual format of the data 2818. The SML 130 and/or the clone module 206 may be configured to provide access to the data in the inconsistent contextual format 2818. The SML 130 and/or the clone module 206 may return from and/or acknowledge the clone operation before the data is relocated in the updated contextual format. The data may be subsequently rewritten (e.g., relocated) in the updated contextual format on the non-volatile storage media 122 using another process, which may be outside of the "critical path" of the clone operation and/or other storage operations. In some embodiments, the data segment 2812 is relocated using a groomer, a storage capacity recovery process, a garbage collection recovery process, or the like. Accordingly, storage clients 116 may be able to access the data segment 2812 through the modified logical interface (both 1024-2048 and 6144-7168) without waiting for the contextual format of the data segment 2812 to be updated to be consistent with the modified logical interface. In other embodiments, logical interface of a checkpoint clone, such as 6144-7168, may be accessible to the clone module 206, to the SML 130, or the like, but may not be accessible to a storage client 116.

In some embodiments, a clone operation of the clone module 206 may further comprise the clone module 206 storing a persistent note on the non-volatile storage media 122 to make a clone operation persistent and/or crash safe. The persistent note may comprise the modified logical interface (e.g., associate the data with logical identifiers of the modified logical interface). Until the contextual format of the data segment 2812 is updated on the non-volatile storage media 122, the modified logical interface of the data segment 2812 may exist only in the index 2804. Therefore, if the index 2804 is lost, due to, inter alia, power failure or data corruption, the clone operation may not be reflected in the reconstructed storage metadata 135 (the clone operation may not be persistent and/or crash safe). In certain embodiments, a checkpoint may be designed or intended to be volatile, and storage clients 116 may expect the loss of a checkpoint after a restart event, so the clone module 206 may not use persistent notes. When the contextual format of the data at 3453-4477 is accessed, the logical interface metadata 2865 of the persistent contextual metadata 2864 indicates that the data is associated only with LIDs 1024-2048, not 1024-2048 and 6144-7168. Therefore, only entry 2814 will be reconstructed (as in FIG. 3A), and 2824 will be omitted; moreover, subsequent attempts to access the data segment 2812 through the modified logical interface (e.g., through 6144-7168) may fail.

A clone may be made persistent and crash safe by storing a persistent note on the non-volatile storage media when the clone is created. The persistent note may comprise an indicator that data segment 2812 is associated with both LID 1024-2048 and 6144-7168 (e.g., the persistent note may comprise the updated logical interface of the data segment 2812). During reconstruction of the index 2804, the persistent note may allow the node 2824 to be created. In some embodiments, the SML 130 and/or the clone module 206 may acknowledge completion of a clone operation when the persistent note is written to the non-volatile storage media 122 (when the SML 130 can reasonably guarantee that the persistent note will be written to the non-volatile storage media 122, and/or when the checkpoint module 204 has completed a checkpoint operation including the clone operation).

Figure 3C:
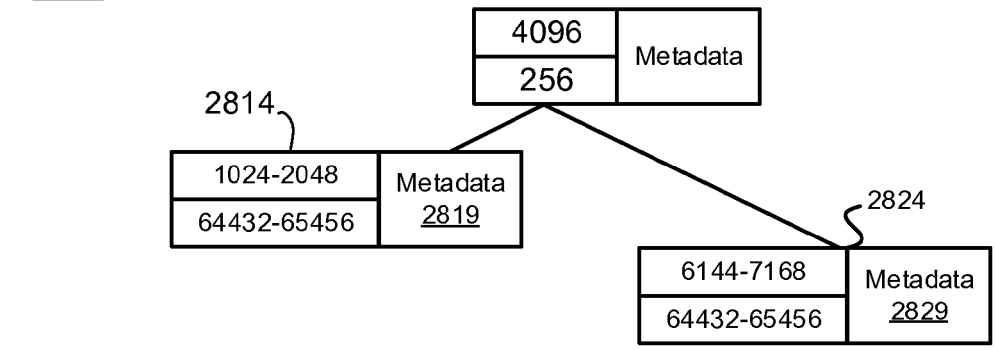
Figure 3C:
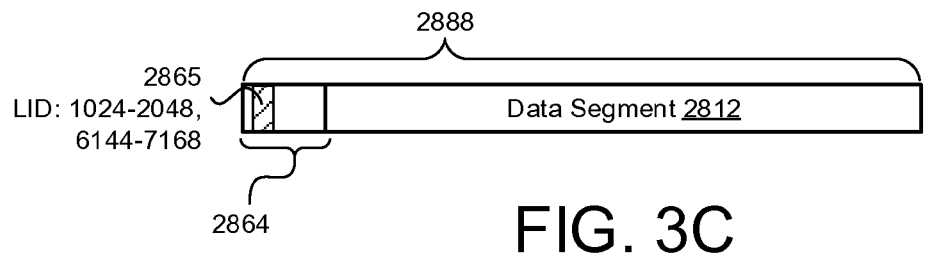

The SML 130 and/or the clone module 206 may be configured to store the data segment 2812 in an updated contextual format that is consistent with the modified logical interface. In some embodiments, the updated contextual format may comprise associating the data segment 2812 with LIDs of both logical copies (e.g., both LIDs 1024-2048 and 6144-7168). FIG. 3C depicts one example of an updated contextual format 2888 for the data segment 2812. As shown in FIG. 3C in one embodiment, the logical interface metadata 2865 indicates that the data segment 2812 is associated with LIDs 1024-2048 and 6144-7168 (as opposed to only 1024-2048). The updated contextual format of the data 2888 was stored on a new storage location (64432-65456), which is reflected in the entries 2814 and 2824 in the index 2804. In response to updating the contextual format of the data 2888, the clone module 206 may invalidate (remove or mark for subsequent removal) relevant previously stored persistent notes from the non-volatile storage media 122.

Alternatively, or in addition, the index 2804 may be stored in a persistent crash safe storage location (e.g., non-transitory storage media 114 and/or non-volatile storage device 120). In response, the clone module 206 may remove relevant previously stored persistent notes corresponding to the clone, even if the contextual format 2818 of the data has not yet been updated on the non-volatile storage media 122.

In embodiments where clone LIDs, such as checkpoint LIDs, are available to storage clients 116, storage operations and/or subsequent checkpoint operations that occur after creating a clone may cause the copy to diverge from the original (e.g., the entries 2814 and 2824 may diverge). For example, when data is written to LIDs of the clone entry 2824, when a subsequent checkpoint trigger event occurs for the clone entry 2824, or the like the media storage locations to which the LIDs are bound may change (due to write out-of-place storage operations). Other storage operations may cause changes to the logical identifier range of the entries 2814 and/or 2824. For instance, appending data to a LID range may cause one of the logical address ranges to be expanded, deleting data may remove portions of a logical address ranges, and so on.

The size of the persistent contextual metadata 2864 may be limited, and as such, separately listing each logical identifier within the logical interface metadata 2865 may be limiting (e.g., may limit the number of clones that can reference a particular data segment).

In some embodiments, the SML 130 and/or the clone module 206 may maintain "reference entries" to facilitate efficient checkpointing operations, cloning operations, or other operations, described below. As used herein, a reference entry refers to an entry that only exists while it is being referenced by one or more entries in the logical address space 134. Accordingly, a reference entry "does not exist" in its own right, but only exists as long as it is being referenced. In some embodiments, reference entries may be immutable (have a state that is unalterable after having been created). The SML 130 and/or the clone module 206 may monitor the reference entries, and may remove reference entries that are no longer being referenced by any other entries in the index. In some embodiments, reference entries may be maintained in a separate portion of the storage metadata 135; reference entries may be maintained in a separate index and/or namespace than other entries in the index 2804. Accordingly, reference entries may be indexed by and/or identified using identifiers that are distinguishable from the logical identifiers of the logical address space 134. Alternatively, reference entries may be assigned logical identifiers selected from a pre-determined range and/or portion of the logical address space 134, such as a logical address range reserved for checkpoints or the like. The reference entries may not be directly accessible by storage clients 116 via the SML 130. Instead, storage clients may reference the data of a reference entry through other entries within the logical address space 134.

Reference entries may be referenced by (e.g., linked to) indirect entries. Accordingly, as used herein, an indirect entry refers an entry in the logical address space 134 that references and/or is linked to a reference entry. Indirect entries may be assigned a logical identifier within the logical address space 134, and may be accessible to the storage clients 116. Indirect entries may reference and/or link to one or more reference entries. Indirect entries may also comprise "local" LIDs like any other entry in the logical address space 134. To access data associated with an indirect entry, the "local" LIDs of the indirect entry may be searched first and, if the LID is not found locally, the search may continue at the reference entries to which the indirect entry is linked. Accordingly, an indirect entry may implement a cascade lookup comprising a local lookup within local LIDs of the indirect entry (if any) and one or more indirect lookups at one or more reference entries linked to the indirect entry.

Figure 3D:
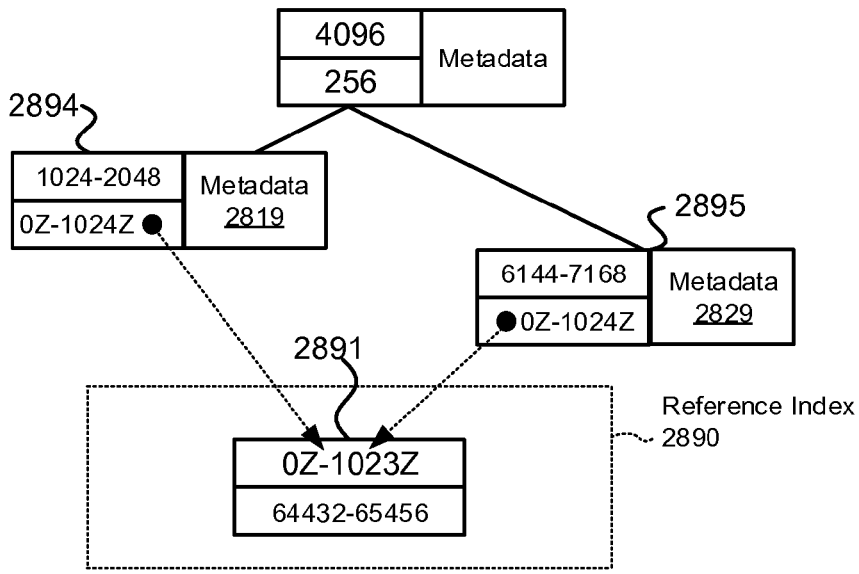
Figure 3D:

In some embodiments, reference entries may be used to represent cloned (or duplicate) data. A single reference entry may represent the cloned data segment, and a plurality of entries may reference the data segment through respective indirect entries. FIG. 3D depicts one embodiment of an index 2805 comprising a reference entry 2891. In the FIG. 3D example, the reference entry 2891 represents the clone of the data segment 2812 of LIDs 1024-2048 to LIDs 6144-7168, as described above.

In response to a request to create a clone of the data segment 2812 (e.g., to clone LIDs 1024-2048 as part of a checkpoint operation), the clone module 206 may be configured to create a new reference entry 2891 in a designated portion of the index 2805 (e.g., the reference index 2890), or in a separate data structure or index. The reference entry 2891 may represent the cloned data segment 2812 and may be referenced by any number of entries in the index 2805. As depicted in FIG. 3D, the reference entry 2891 may be bound to the media storage locations of the cloned data segment 2812 (media storage locations 3453-4477). The reference entry 2891 may be assigned an identifier (e.g., OZ-1023Z). The identifier 2894 pointing to the reference entry 2891 may be in a separate namespace than the logical address space 134 of the index 2805 (e.g., selected from a separate set of identifiers). Alternatively, in some embodiments, the reference entry 2891 may be assigned LIDs within a designated portion or range of logical address space 134. The reference entry 2891 may not be directly accessible by storage clients 116 via the SML 130 interface 132. As described below, the reference entry 2891 may be referenced through one or more indirect entries 2894 and/or 2895.

The clone module 206 may further modify the logical interface of the data segment 2812 in accordance with the clone operation; the modified logical interface may allow the data segment 2812 to be referenced through the LIDs 1024-2048 of the indirect entry 2894 and the LIDs 6144-7168 of the indirect entry 2985. The entries 2894 and 2895 may link to (e.g., reference) the reference entry 2891 as opposed to directly referencing the media storage locations of the data segment 2812.

As described above, the modified logical interface of the data segment 2812 is inconsistent with the contextual format of the data 2818. As depicted in FIGS. 3A-B, the contextual format of the data 2818 indicates that the logical interface to the data segment 2812 includes LIDs 1024-2048, and does not identify the reference entry identifiers OZ-1024Z and/or the identifiers of the clone 6144-7168. As such, the data segment 2812 may be relocated (e.g., rewritten) in an updated contextual format 2898. The contextual format 2898 may comprise persistent contextual metadata 2864, as described above. The logical interface indicator 2865 may associate the data segment 2812 with the reference entry 2984 (e.g., OZ-1023Z), as opposed to separately identifying the LIDs that reference the data segment 2812. Accordingly, the use of the indirect reference entry 2891 allows the logical interface of the data segment 2812 to comprise any number of LIDs, independent of size limitations of the contextual data format 2898 (e.g., independent of the number of LIDs that can be included in the logical interface metadata 2865). Moreover, additional logical copies of the reference entries 2984 may be made without updating the contextual format of the data on the non-volatile storage media 122.

In some embodiments, each time a LID is allocated, the LID may be linked to a corresponding reference entry in the reference index 2890 (e.g., a clone with a single copy). The approach may result in an additional layer of mapping for the new LIDs, however the use of reference entries may facilitate the creation of clones (and/or deduplication) for purposes of checkpointing data. Creating a clone may comprise the clone module 206 linking new LIDs to the reference entries (as discussed above), without updating the contextual format of the data. An update to the contextual format of the data may not be required because the existing contextual format already associates the data with reference entries (in the logical interface metadata), as described above. The new LIDs may be associated with the reference entries via a persistent note (or other persistent indicator), as described above, without rewriting and/or relocating the data.

Storage clients 116 may reference the data segment 2812 through the modified logical interface while (or before) the contextual format of the data 2898 is stored on the non-volatile storage media 122. In response to storing the data in the updated contextual format 2898 (or persisting the storage metadata 135), the clone module 206 may invalidate and/or remove the persistent note from the non-volatile storage media 122.

Figure 3E:
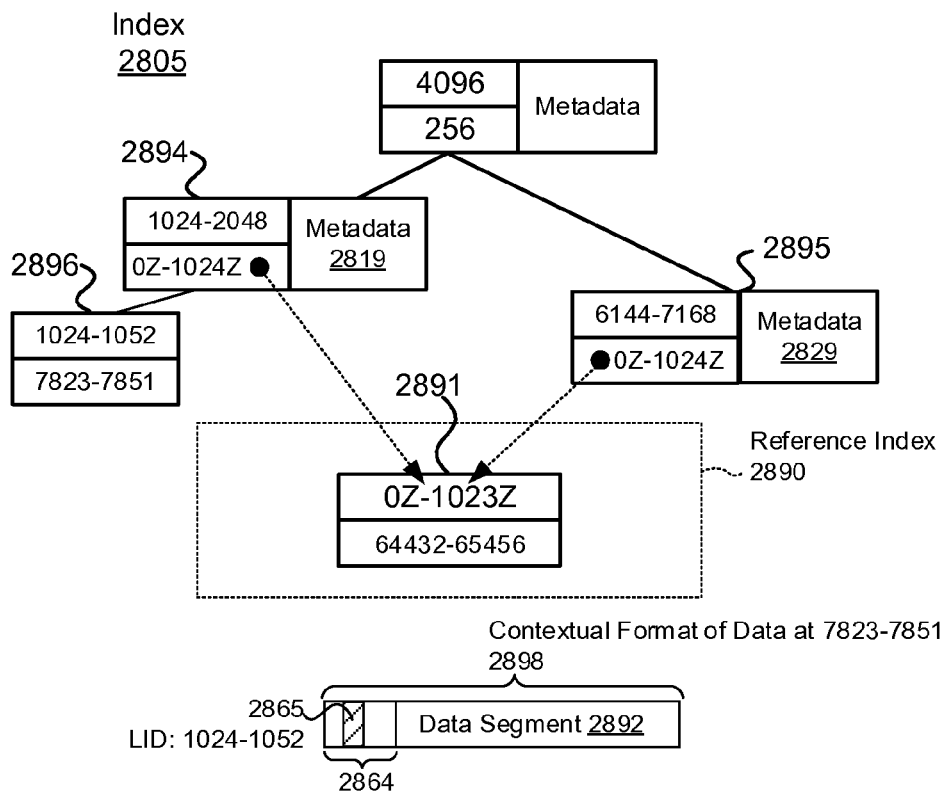

As described above, the indirect references 2894 and/or 2895 may comprise one or more "local" LIDs. Local LIDs may be used to reflect differences between the logical copies. For example, after the clone operation of a checkpoint operation, a storage client 116 may modify data at one of the clones (e.g., modify data at 1024-1052). The modification may comprise writing the data out of place on the non-volatile storage media 122 in a contextual format 2899, and updating the index 2805 to reference the updated data (stored on media storage locations 7823-7851). Updating the index 2805 may comprise adding a new "local" entry 2896 (See FIG. 3E) under the indirect entry 2894. As illustrated in FIG. 3E, the local entry 2896 directly references the media storage locations of the modified data (7923-7851) as opposed to a link to the reference entry 2891.

In response to a request pertaining to data 1024-1052 (or sub-set thereof), the SML 130 may search the indirect entry 2894, and may identify the local entry 2896. The local entry 2896 may then be used to satisfy the request (e.g., read data from media storage locations 7823-7851 rather than 64432-64460 per the reference entry 2891. However, requests for LIDs that are not found in the local entries (e.g., LIDs 1053-2048) may continue to be serviced using the reference entry 2891. Accordingly, the SML 130 may use the indirect entry 2894 and reference entry 2891 to implement a "cascade lookup" for logical identifiers pertaining to the clone, which may be part of a checkpoint.

Figure 3F:
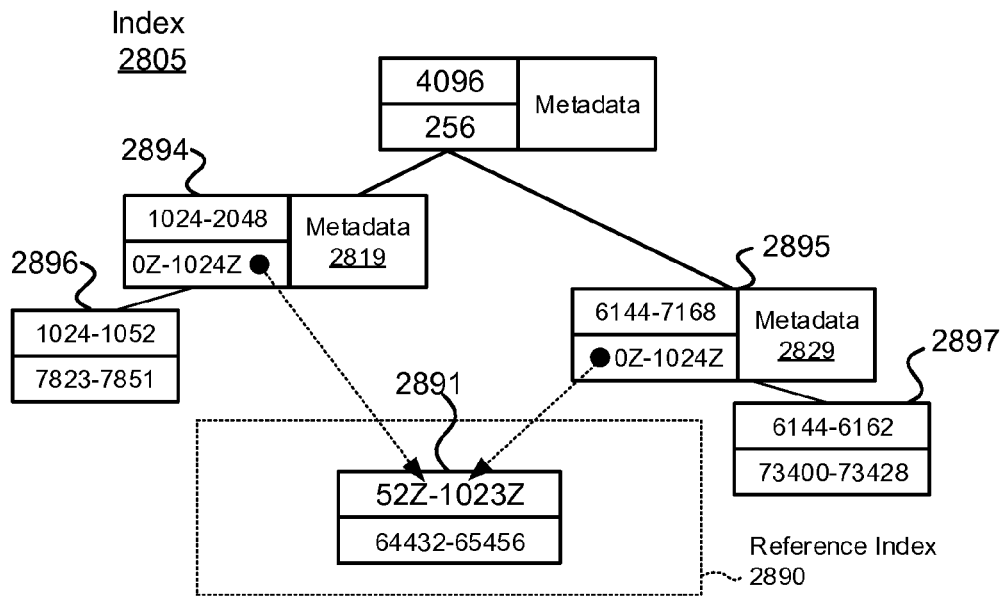

In a further example, illustrated in FIG. 3F, a storage client 116 may modify data of the clone through another one of the logical interfaces (e.g., LIDs 6144-6162). If the clone was associated with a currently executing checkpoint operation, in certain embodiments, the clone module 206 and/or the checkpoint module 204 may perform a copy-on-write operation for the clone as described above, to allow the storage client 116 to continue with the modification as described above. The modified data may be referenced using a local entry 2897 of the indirect entry 2895, as described above. Since each of the clones now has its own, respective copy of OZ-52Z, that portion of the reference entry 2891 is no longer being referenced, and may be removed by the clone module 206 (as depicted in FIG. 3F). The clones may continue to diverge, until neither 2984 nor 2895 references any portion of the reference entry 2891, at which point the reference entry 2891 may be removed.

The SML 130 may be configured to "groom" the reference index 2890. In some embodiments, each reference index entry 2891 comprises metadata that includes a reference count (not shown). The clone module 206 may increment the reference count as new references or links to the reference entry 2891 are added, and may decrement the reference count in response to removing a reference to the entry 2891. In some embodiments, the clone module 206 may maintain reference counts for each identifier of the reference entry 2891 and/or within sub-ranges thereof. Alternatively, the clone module 206 may maintain reference counts for the reference entries 2891 as a whole. When a reference count reaches 0, the reference entry 2891 (or a portion thereof) may be removed from the reference index 2890. Removing a reference entry 2891 (or portion of a reference entry) may further comprise invalidating the corresponding data on the non-volatile storage media 122, as described above.

In another example, the SML 130 may remove reference entries using a "mark-and-sweep" approach. The SML 130 (or other process) may periodically check references to entries in the reference index 2890 by, inter alia, following references thereto in the index 2805. Entries that are not referenced by any entries during the mark-and-sweep may be removed, as described above.

The SML 130 may leverage the storage metadata 135 to perform other processes, such as deduplication. A deduplication module may be configured to identify duplicated data on the non-volatile storage media 122. Duplicated data may be identified using any suitable mechanism. In some embodiments, duplicated data is identified using a data signature, which may comprise a signature, hash code, cyclic code, or the like. The signature may be stored within the index 2805 (e.g., in metadata associated with the entries) and/or may be maintained and/or indexed separate data structure (not shown). The deduplication module may compare data signatures and, upon detecting a signature match, may deduplicate the data. Deduplicating data may comprise verifying the signature match (e.g., performing a byte to byte comparison), creating a reference entry to represent the duplicated data, and/or linking one or more indirect entries to the reference entry.

Figure 3G:
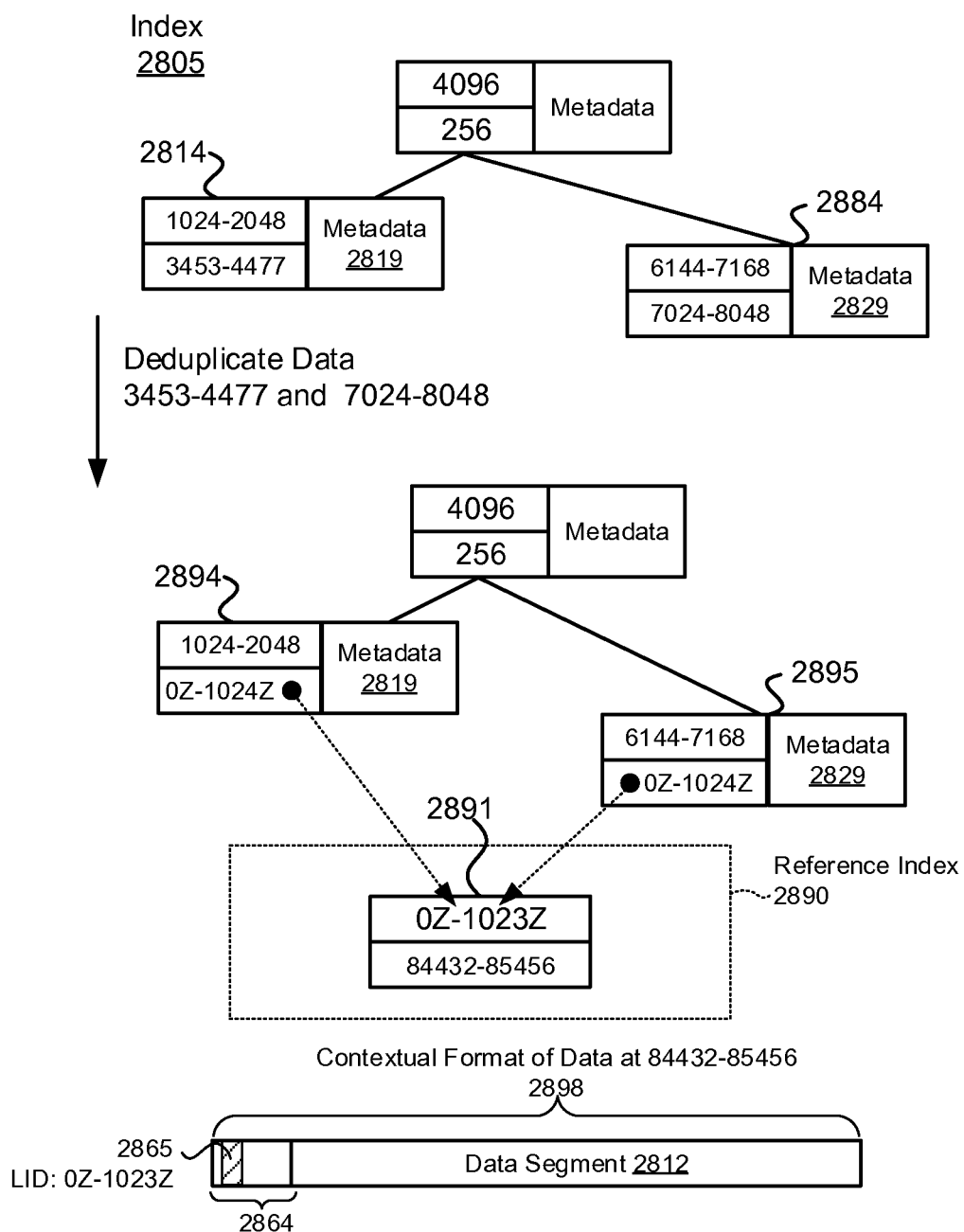
FIG. 3G depicts one embodiment of a deduplication operation.

FIG. 3G illustrates one example of storage metadata for managing deduplication. The index 2805 may comprise entries 2814 and 2884, which may reference duplicated data (e.g., duplicated data segment 2812) stored at different respective media storage locations on the non-volatile storage media 3453-4477 and 7024-8048. The duplicated data segment 2812 may be identified and/or verified by a deduplication module.

In response to identifying and/or verifying that entries 2814 and 2884 reference duplicate data, the SML 130 may be configured to deduplicate the data, which may comprise modifying the logical interface of the duplicated data to associate a single "version" of the data segment 2812 with both sets of LIDs 1024-2048 and 6144-7168, as in the clone examples above.

One of the clones of the data may be invalidated and/or removed from the non-volatile storage media 122 and a reference entry 2891 may represent a single copy of the data segment 2812; indirect entries 2894 and 2895 may be linked to the reference entry 2891, as described above, resulting in the logical interface of the data segment 2812 being referenced by both sets of LIDs 1024-2048 and 6144-7168. Deduplicating the data may further comprise storing a persistent note on the non-volatile storage media 122 to associate the data segment 2812 with the updated logical interface thereof (e.g., associate the data segment 2812 with the reference entry 2891 and/or the linked indirect entries 2894 and 2895), as described above.

The modified logical interface of the data may be inconsistent with the contextual format of the data on the non-volatile storage media 122 (e.g., the contextual format may associate the data with only one of the set of LIDs 1024-2048 or 6144-7168). The contextual format of the data may be updated to be consistent with the modified logical interface, as described above. Updating the contextual format may comprise relocating (e.g., rewriting) the data segment 2812 in an updated contextual format 2898 to new media storage locations (e.g., media storage locations 84432-84556). The updated contextual format 2898 may comprise persistent contextual metadata 2864 that includes logical interface metadata 2865 to associates the data segment 2812 with the reference entry 2891 (e.g., identifiers OZ-1023Z), as described above. The updated contextual format 2898 may be written out-of-place to other media storage location of the non-volatile storage media 122 and/or on another non-volatile device 120A-N.

Although FIGS. 3A-G depict cloning and/or deduplicating a single entry or range of LIDs, the disclosure is not limited in this regard. In some embodiments, a plurality of LID ranges may be cloned in a single clone operation. For example, a cloning operation may clone an entry along with all of its child entries. In another example, a clone operation may comprise copying the entire contents of the index (e.g., all of the entries in the index). This type of clone operation may be used to create a checkpoint or snapshot of a logical address space 134 (or a particular LID range). As used herein, a checkpoint or snapshot may refer to the state of data, of a storage device, and/or of a set of LIDs at a particular point in time. In one embodiment, a checkpoint or snapshot comprises a copy or clone of data at a particular time that may remain accessible to storage clients 116 independently from the data itself. A checkpoint or snapshot of data may persist the state of the copied logical address range and/or associated data despite changes to the original data. In certain embodiments, a checkpoint or snapshot of data may be writable and/or editable independently from the data itself.

The SML 130 may provide other functionality involving the modification of the logical interface of data, providing access to the data in a contextual format that is inconsistent with the modified logical interface, and updating the contextual format of the data to be consistent with the modified logical interface. For example, in some embodiments, the SML 130 provides a move operation. As used herein, a move operation comprises modifying the logical interface of a data segment (e.g., changing the LID of a data segment).

In certain embodiments, the checkpoint module 204, in cooperation with the clone module 206 or the like, consolidates, merges, or otherwise combines a clone from the clone module 206 with data from the volatile memory 112 and/or 128 to form a checkpoint of the data stored on the non-volatile storage media 122. In embodiments where the clone and the copied data from the volatile memory 112 and/or 128 are not stored contiguously in the non-volatile storage media 122, the index 2805 may include multiple entries for a single checkpoint. The multiple entries in the index 2805, in certain embodiments, may be adjacent to each other in the index 2805 due to adjacent LIDs for the clone and the copied data.

When new storage entries are added to the index 2805, the clone module 206 may perform a merge operation. In a merge operation, an existing storage entry may be "merged" with one or more other storage entries. For instance, a new storage entry for LIDs 084-088 may be merged with an existing entry for LIDS 072-083. The merge may comprise modifying the LID of the storage entry to include the new addresses (e.g., 072-088) and/or to reference the storage locations to include the storage location on which the data was stored.

Referring back to the cloning examples of FIGS. 3A and 3B, in other examples, clone operations may be used to perform atomic operations, such as multi-step writes or transactions. An atomic operation to modify a data in a particular logical address range may comprise creating a clone of the logical address range, implementing storage operations within the clone, and, when the operations complete, "folding" the clone back into the logical address space 134 (e.g., overlaying the original logical address range with the clone). As used herein, "folding" a logical address range refers to combining two or more address ranges together (e.g., folding a logical address range with a clone thereof). The folding may occur according to one of a plurality of operational modes, which may include, but are not limited to: an "overwrite" mode, in which the contents of one of one logical address range "overwrites" the contents of another logical address range, a "merge" mode, in which the contents of the logical address ranges are merged together (e.g., in a logical OR operation), or the like. Folding may also apply to the merging of multiple clones.

For example, the clone module 206 may merge a clone by folding the clone back into the logical address space 134 of the original logical range. The clone module 206 may overwrite the contents of the original logical address range with the contents of the clone, may "merge" the logical address ranges (e.g., in an OR operation), or the like. In some embodiments, the merging comprises deleting (e.g., invalidating) the clone, which may comprise removing entries of the clone from the storage metadata index, removing shared references to media storage locations from a reference count data structure, or the like. To perform a merge, the clone module 206 may further modify a logical interface of the merged data, as described above. The modified logical interface may change the LIDs used to reference the data. The modified logical interface may be inconsistent with the contextual format of the data on the non-volatile storage media 122. Therefore, the clone module 206 may further provide access to the data in the inconsistent contextual format and/or update the contextual format of the data, as described above.

Returning to FIG. 2, in one embodiment, the storage namespace module 208 determines a persistent storage namespace identifier for a checkpoint. In certain embodiments, the storage clients 116 may manage their own persistent storage namespaces and the storage namespace module 208 may receive a persistent storage namespace identifier for a checkpoint from a storage client 116 as part of a checkpoint request for the checkpoint. In other embodiments, the storage namespace module 208 may generate a persistent storage namespace identifier for a checkpoint and assigns the persistent storage namespace identifier to the checkpoint, in response to a checkpoint trigger event or the like. The storage namespace module 208, in certain embodiments, may determine a persistent storage namespace identifier for a checkpoint according to a deterministic pattern, such that a storage client 116 or another entity may determine the same persistent storage namespace identifier later. For example, the storage namespace module 208 may encode a virtual memory address or virtual memory address range for a checkpoint into the persistent storage namespace identifier itself, may include a timestamp, a revision number, a sequence number, a counter, or another identifier in a persistent storage namespace identifier, or the like.

While volatile memory namespaces typically are not persistent across restart events, a persistent storage namespace identifier for a checkpoint is persistent and accessible across restart events, so that the checkpoint is accessible to a storage client 116 after a restart event. Examples of persistent storage namespace identifiers, in various embodiments, may include a filename of a file system, a LUN address, a LUN name, or the like. Each persistent storage namespace identifier, in one embodiment, is distinct and unique to the specific checkpoint, file, or the like that the persistent storage namespace identifier identifies. A storage client 116, in a further embodiment, may read, write, erase, and/or perform other file operations on a checkpoint using the persistent storage namespace identifier associated with the checkpoint, as a standard file or the like. For example, a storage client 116 may archive, copy, move, modify, or erase a persisted checkpoint using the persistent storage namespace identifier of the checkpoint.

In certain embodiments, as described below with regard to the version module 210, the checkpoint module 204 may maintain multiple checkpoints for the same range of virtual memory addresses. The storage namespace module 208 may determine unique persistent storage namespace identifiers for each of the multiple checkpoints for the same range of virtual memory addresses. In other embodiments, the checkpoint module 204 may replace or logically overwrite a checkpoint with a subsequent checkpoint for the same range of virtual memory addresses and the storage namespace module 208 may determine the same persistent storage namespace identifier for the subsequent checkpoint. As described above with regard to the clone module 204, the storage namespace module 208 may provide a storage client 116 with access to a checkpoint as a single file or another data object, even if the data of the checkpoint is located in disparate locations in the sequential log of the non-volatile storage device 120, based on entries for the data of the checkpoint in a logical-to-physical address mapping structure or other storage metadata 135.

By associating a checkpoint with a persistent storage namespace identifier such as a filename, LUN identifier, or the like, the storage namespace module 208 allows a storage client 116 to access a checkpoint or snapshot of a range of the virtual memory 400 (which may include the whole address range) of the storage client 116 at the time of the checkpoint, even after a restart event for the computing device 110, regardless of whether the data was stored in volatile memory 112, 128 at the time of the checkpoint. By accessing a stored persistent checkpoint using a persistent storage namespace identifier, a storage client 116 can resume previous execution states, segregate or group data by virtual address range for separate tasks, or otherwise persist a state of virtual memory 400 for subsequent use. For example, a storage client 116 may use a first data set associated with a first range of virtual memory addresses, checkpoint the first range of virtual memory 400, use a second data set associated with a second range of virtual memory addresses, checkpoint the second range of virtual memory addresses, and so on, eventually returning to load the data of the first range of virtual memory 400, using standard file input/output commands with the checkpoints, or the like.

In one embodiment, the version module 210 maintains multiple checkpoints for the same range or ranges of virtual memory addresses. For example, the storage namespace module 208 may cooperate with the version module 210 to provide access to a different, subsequent version of a range of virtual memory using a different persistent storage namespace identifier, iterating or updating the persistent namespace identifier in response to each checkpoint trigger event or the like.

In embodiments where the extended memory module 202 cooperates with the log storage module 137 to store data to an append point of an append-only log-based writing structure or log, the version module 210 may automatically maintain one or more previous versions of a checkpoint for a range of virtual memory addresses in the log. A checkpoint may be split into multiple parts or pieces in the log, and a checkpoint note or other storage metadata 135 may be stored for the checkpoint. A checkpoint note, in one embodiment, may comprise an index of each media address associated with a checkpoint, even if the data of the checkpoint is located at disparate locations in the log.

The storage namespace module 208 may cooperate with the version module 210 to determine different unique persistent storage namespace identifiers for different versions of checkpoints for the same range of virtual memory addresses. For example, the storage namespace module 208 may include a timestamp, a revision number, a sequence number, a counter, or another identifier in each different persistent storage namespace identifier for different versions of checkpoints for the same range of virtual memory addresses. The storage namespace module 208 and/or the version module 210, in certain embodiments, may us a direct file system (DirectFS) associated with the logical address space 134 of the storage device 120. By maintaining multiple versions of checkpoints for the same range of virtual memory addresses, in certain embodiments, the version module 210 allows a storage client 116, a user, or the like to dynamically select and load various virtual memory states, to resume any one of several execution states, access different data sets stored to the same virtual memory range at different times, and the like.

The barrier module 212, in certain embodiments, cooperates with the checkpoint module 204 to ensure consistency of data, flushing data of volatile memory 112, 128, data cached in the processor complex 111, or the like to the non-volatile storage media 122 using the flush module 214 and/or the completion module 216, and may ensure consistency of data for the checkpoint module 204.

In one embodiment, the flush module 214, in response to a checkpoint request or another checkpoint trigger event, is configured to issue, perform, or otherwise execute a serializing instruction for virtual memory of a processor complex 111 (e.g., dirty data of the virtual memory stored in a processor cache or the like). A serializing instruction flushes, destages, or otherwise synchronizes data from a processor cache of the processor complex 111 and/or the volatile memory 112, 128 or another memory system to underlying storage, such as the non-volatile storage media 122. The non-volatile storage media 122 may receive data that the flush module 214 flushes or destages from the processor complex 111 and/or the volatile memory 112, 128. The non-volatile storage media 122, or other underlying memory device, to which data is flushed or destaged from the processor complex 111 in response to a serializing instruction, in one embodiment, is selected by a memory manager for the processor complex 111, a virtual memory manager, or the like, based on which underlying memory device is mapped into a logical address range for the data in virtual memory of the processor complex 111.

Examples of serializing instructions include an MFENCE instruction, an SFENCE instruction, an xchg instruction (e.g., compare and swap, compare and swap double, CMPXCHG, CMPXCHNG8B, CMPXCHNG16B, and/or CMP8XCHG16), or the like. In certain embodiments, a serializing instruction ensures and/or guarantees that operations, such as memory semantic load and store operations, that precede the serializing instruction, are flushed, destaged, or otherwise synchronized prior to operations that follow the serializing instruction.

In one embodiment, the flush module 214 issues, performs, or otherwise executes a serializing instruction for an entire processor cache or set of processor caches, for an entire virtual memory of the processor complex 111, or the like in response to an auto-commit request. In another embodiment, the flush module 1914 may issue, perform, or otherwise execute a serializing instruction just a predefined range of virtual memory of the processor complex 111, for just dirty data, updated data, or the like which the non-volatile storage media 122 does not yet store, or the like, so that data associated with other memory devices, clean data already stored in the non-volatile storage media 122, or the like is not necessarily flushed, destaged, and/or synchronized. For example, the flush module 214 may include a virtual memory address range for one or more pages of virtual memory, for one or more sub-page or byte-level ranges of data of virtual memory, or the like in a serializing instruction, so that the processor cache, the volatile memory 112, 128, or the like flushes, destages, or otherwise synchronizes just the indicated memory address range.

In one embodiment, the completion module 216 is configured to determine completion of the serializing instruction flushing, destaging, or otherwise synchronizing data to the non-volatile storage media 122. The completion module 216, in certain embodiments, determines that a serializing instruction has completed by placing a predefined completion identifier in the processor cache after the flush module 214 issues the serializing instruction, issuing a second serializing instruction, and determining that the serializing instruction is complete once the completion identifier is received at the non-volatile storage device 120. Because a serializing instruction ensures or guarantees that operations performed prior to the serializing instruction are synchronized prior to operations performed after the serializing instruction, the synchronization of the completion identifier to the non-volatile storage device 120 in response to the second serializing instruction indicates that the first serializing instruction has completed. In other embodiments, the completion module 216 may determine completion of the serializing instruction without issuing a second serializing instruction. For example, the processor complex 111 may notify the completion module 216 of completion of the serializing instruction by sending an interrupt, writing a completion identifier to a control status register which the completion module 216 may poll, or the like.

The completion module 216, in certain embodiments, may place a completion identifier in the processor cache by writing or storing the completion identifier to a virtual memory address of the host computing device 110 mapped to a control status register of the non-volatile storage device 120. In another embodiment, the completion module 216 may place a completion identifier in the processor cache by writing or storing the completion identifier to a virtual memory address mapped to a page or other location in the non-volatile storage media 122, or the like. The completion module 216, in various embodiments, may detect arrival of a completion identifier in the non-volatile storage device 120 by polling a control status register of the non-volatile storage device 120, by polling a predefined location in the non-volatile storage media 122, by receiving an interrupt, or the like.

In one embodiment, the completion module 216 indicates, to a requesting client, completion of a checkpoint request. The completion module 216, in various embodiments, may indicate or notify a client of completion of a checkpoint request by returning execution control to the client, by sending a return value to the client, by sending an interrupt to the client, by writing a completion identifier to a control status register polled by the client, or the like.

The hybrid checkpointed memory module 136, in certain embodiments, may guarantee or ensure persistence of data flushed or checkpointed to the non-volatile storage media 122 in response to the completion module 216 determining that a serializing instruction for the flushed data has completed. In a further embodiment, the hybrid checkpointed module 136 may guarantee or ensure persistence of operations received for virtual memory of the processor 111 prior to a checkpoint trigger event in response to the completion module 216 determining completion of a serializing instruction for the checkpoint trigger event. Once data has been synchronized or stored in the non-volatile storage media 122, the non-volatile storage media 122 preserves or persists the data and provides the data to storage clients 116. In this manner, in certain embodiments, the hybrid checkpointed memory module 136 can provide persistence and consistency of data for storage clients 116 even if a processor cache does not guarantee an order of data, an order of operations, or the like.

As described above, in certain embodiments, the non-volatile storage device 120 is coupled to the host computing device 110 using a communications bus 125 such as a PCI-e bus 125 or the like. In one embodiment, the communications bus 125 supports strong operation ordering, at least for transactions within a similar traffic class or the like, so that the communications bus 125 maintains an order in which data is flushed from the processor cache to the non-volatile storage media 122. For example, PCI-e 2.0, PCI-e 3.0, and the like support strong ordering semantics for transactions within the same traffic class. By flushing or destaging data from a processor cache, virtual memory, or the like to non-volatile storage media 122 over a communications bus 125 that supports strong operation ordering, in certain embodiments, the completion module 216 may ensure that a serializing instruction has actually completed in response to receiving a completion identifier at the non-volatile storage device 120 because the data of the serializing instruction and the completion identifier are received in operation order. In embodiments where the communications bus 125 does not support operation ordering, the flush module 214 may act as an intermediary between the processor complex 111 and the communications bus 125, coordinating with the controller 126 to provide strong operation ordering over the communications bus 125 or the like. For example, the flush module 214 may queue commands in a FIFO queue and manage and confirm the exchange of each command with the controller 126, or the like to enforce strong or strict operation ordering. The communications bus 125 may be in communication with the processor complex 111 through a Northbridge device, a root complex, or the like of the processor complex 111.

Figure 5:
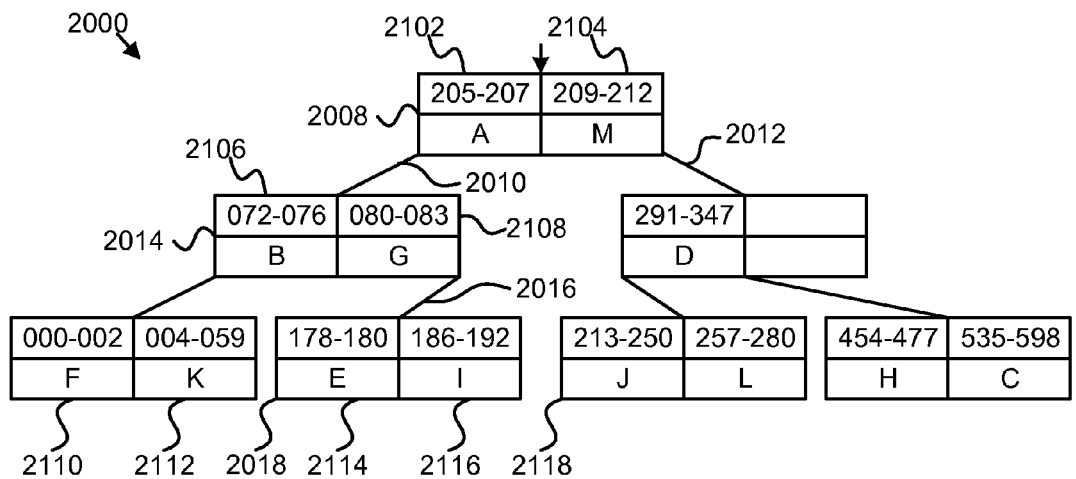
FIG. 5 is a schematic block diagram illustrating one embodiment of a mapping structure, a sparse logical address space, and a log-based writing structure.
Figure 5:
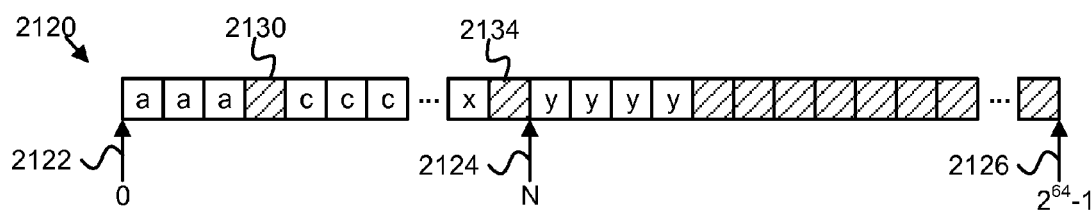
Figure 5:
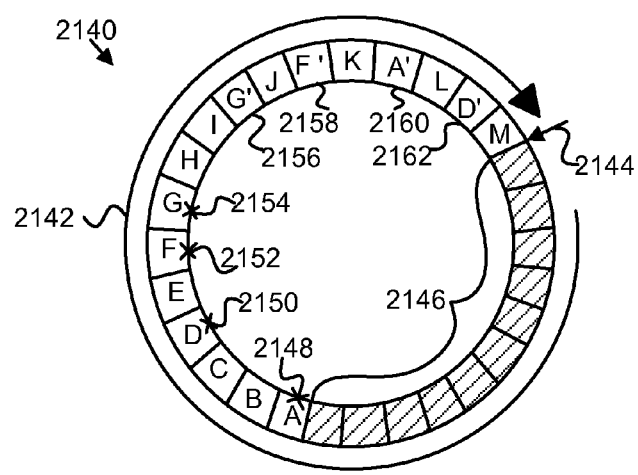

FIG. 5 depicts one embodiment of an address mapping structure 2000, a logical address space 2120, and a sequential, log-based, append-only writing structure 2140. The address mapping structure 2000, in one embodiment, is maintained by the storage controller 124, the storage management layer 130, a logical-to-physical translation layer or address mapping structure, or the like to map LBAs or other logical addresses to physical locations on the non-volatile storage media 122. The address mapping structure 2000, in the depicted embodiment, is a B-tree with several entries. In the depicted embodiment, the nodes of the address mapping structure 2000 include direct references to physical locations in the non-volatile storage device 120. In other embodiments, the address mapping structure 2000 may include links that map to entries in a reverse map, or the like. The address mapping structure 2000, in various embodiments, may be used either with or without a reverse map. In other embodiments, the references in the address mapping structure 2000 may include alpha-numerical characters, hexadecimal characters, pointers, links, and the like.

The address mapping structure 2000, in the depicted embodiment, includes a plurality of nodes. Each node, in the depicted embodiment, is capable of storing two entries. In other embodiments, each node may be capable of storing a greater number of entries, the number of entries at each level may change as the address mapping structure 2000 grows or shrinks through use, or the like.

Each entry, in the depicted embodiment, maps a variable length range of LBAs of the non-volatile storage device 120 to a physical location in the storage media 122 for the non-volatile storage device 120. Further, while variable length ranges of LBAs, in the depicted embodiment, are represented by a starting address and an ending address, in other embodiments, a variable length range of LBAs may be represented by a starting address and a length, or the like. In one embodiment, the capital letters 'A' through 'M' represent a logical or physical erase block in the physical storage media 122 of the non-volatile storage device 120 that stores the data of the corresponding range of LBAs. In other embodiments, the capital letters may represent other physical addresses or locations of the non-volatile storage device 122. In the depicted embodiment, the capital letters 'A' through 'M' are also depicted in the log-based writing structure 2140 which represents the physical storage media 122 of the non-volatile storage device 120.

In the depicted embodiment, membership in the address mapping structure 2000 denotes membership (or storage) in the non-volatile storage device 120. In another embodiment, an entry may further include an indicator of whether the non-volatile storage device 120 stores data corresponding to a logical block within the range of LBAs, data of a reverse map, and/or other data.

In the depicted embodiment, the root node 2008 includes entries 2102, 2104 with noncontiguous ranges of LBAs. A "hole" exists at LBA "208" between the two entries 2102, 2104 of the root node. In one embodiment, a "hole" indicates that the non-volatile storage device 120 does not store data corresponding to one or more LBAs corresponding to the "hole." In one embodiment, the non-volatile storage device 120 supports block I/O requests (read, write, trim, etc.) with multiple contiguous and/or noncontiguous ranges of LBAs (e.g., ranges that include one or more "holes" in them). A "hole," in one embodiment, may be the result of a single block I/O request with two or more noncontiguous ranges of LBAs. In a further embodiment, a "hole" may be the result of several different block I/O requests with LBA ranges bordering the "hole."

In the depicted embodiment, similar "holes" or noncontiguous ranges of LBAs exist between the entries 2106, 2108 of the node 2014, between the entries 2110, 2112 of the left child node of the node 2014, between entries 2114, 2116 of the node 2018, and between entries of the node 2118. In one embodiment, similar "holes" may also exist between entries in parent nodes and child nodes. For example, in the depicted embodiment, a "hole" of LBAs "060-071" exists between the left entry 2106 of the node 2014 and the right entry 2112 of the left child node of the node 2014.

The "hole" at LBA "003," in the depicted embodiment, can also be seen in the logical address space 2120 of the non-volatile storage device 120 at logical address "003" 2130. The hash marks at LBA "003" 2140 represent an empty location, or a location for which the non-volatile storage device 120 does not store data. The "hole" at LBA 2134 in the logical address space 2120, is due to one or more block I/O requests with noncontiguous ranges, a trim or other deallocation command to the non-volatile storage device 120, or the like. The address mapping structure 2000 supports "holes," noncontiguous ranges of LBAs, and the like due to the sparse and/or thinly provisioned nature of the logical address space 2120.

The logical address space 2120 of the non-volatile storage device 120, in the depicted embodiment, is sparse and/or thinly provisioned, and is larger than the physical storage capacity and corresponding storage device address space of the non-volatile storage device 120. In the depicted embodiment, the non-volatile storage device 120 has a 64 bit logical address space 2120 beginning at logical address "0" 2122 and extending to logical address "264-1" 2126. Because the storage device address space corresponds to only a subset of the logical address space 2120 of the non-volatile storage device 120, the rest of the logical address space 2120 may be allocated, mapped, and used for other functions of the non-volatile storage device 120.

The sequential, log-based, append-only writing structure 2140, in the depicted embodiment, is a logical representation of the physical storage media 122 of the non-volatile storage device 120. In certain embodiments, the non-volatile storage device 120 stores data sequentially, appending data to the log-based writing structure 2140 at an append point 2144. The non-volatile storage device 120, in a further embodiment, uses a storage space recovery process, such as a garbage collection module or other storage space recovery module that re-uses non-volatile storage media 122 storing deallocated/unused logical blocks. Non-volatile storage media 122 storing deallocated/unused logical blocks, in the depicted embodiment, is added to an available storage pool 2146 for the non-volatile storage device 120. By clearing invalid data from the non-volatile storage device 120, as described above, and adding the physical storage capacity corresponding to the cleared data back to the available storage pool 2146, in one embodiment, the log-based writing structure 2140 is cyclic, ring-like, and has a theoretically infinite capacity.

In the depicted embodiment, the append point 2144 progresses around the log-based, append-only writing structure 2140 in a circular pattern 2142. In one embodiment, the circular pattern 2142 wear balances the non-volatile storage media 122, increasing a usable life of the non-volatile storage media 122. In the depicted embodiment, a garbage collection module or other storage capacity recovery process has marked several blocks 2148, 2150, 2152, 2154 as invalid, represented by an "X" marking on the blocks 2148, 2150, 2152, 2154. The garbage collection module, in one embodiment, will recover the physical storage capacity of the invalid blocks 2148, 2150, 2152, 2154 and add the recovered capacity to the available storage pool 2146. In the depicted embodiment, modified versions of the blocks 2148, 2150, 2152, 2154 have been appended to the log-based writing structure 2140 as new blocks 2156, 2158, 2160, 2162 in a read, modify, write operation or the like, allowing the original blocks 2148, 2150, 2152, 2154 to be recovered.

Figure 6:
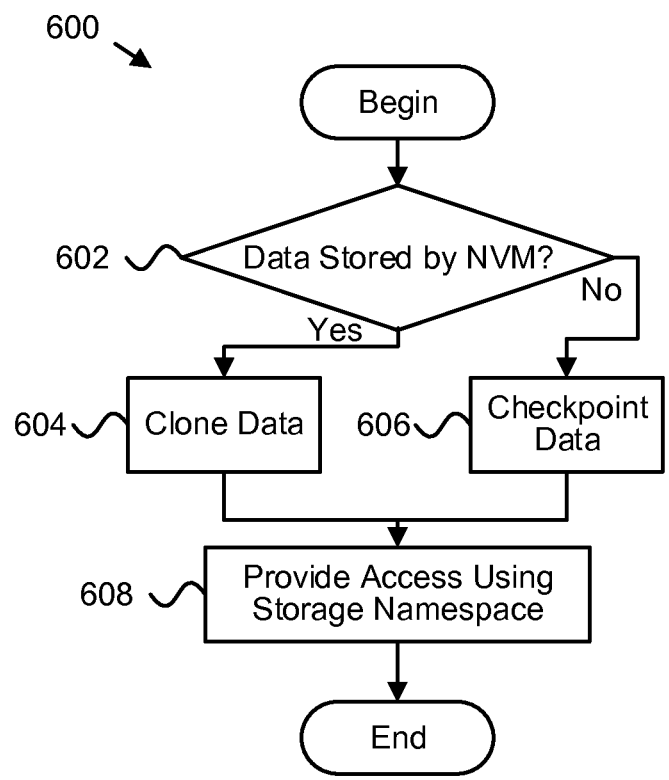
FIG. 6 is a schematic flow chart diagram illustrating one embodiment of a method for hybrid checkpointed memory.

FIG. 6 depicts one embodiment of a method 600 for hybrid checkpointed memory. The method 600 begins, and the extended memory module 202 determines 602 which data from a range of virtual memory 400 is stored by a non-volatile medium 122. The clone module 206 clones 604 data of the range of virtual memory that is already stored by the non-volatile medium 122. The checkpoint module 204 checkpoints 606, to the non-volatile medium 122, data of the range of virtual memory that is not yet stored by the non-volatile medium 122. The storage namespace module 208 provides 608 access to the data of the range of virtual memory from the non-volatile medium using a persistent storage namespace identifier associated with the cloned data and the checkpointed data and the method 600 ends.

Figure 7:
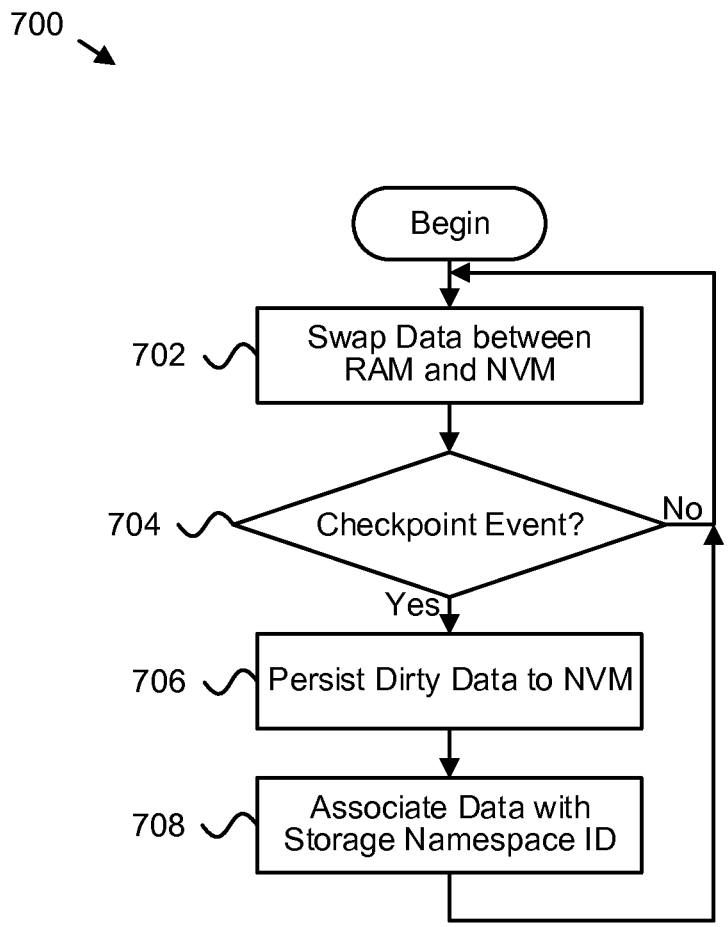
FIG. 7 is a schematic flow chart diagram illustrating another embodiment of a method for hybrid checkpointed memory.

FIG. 7 depicts another embodiment of a method 700 for hybrid checkpointed memory. The method 700 begins and an extended memory module 202 swaps 702 data of virtual memory 400 for a host device 110 between random access memory (RAM) 112, 128 and non-volatile memory 122. A checkpoint module 204 persists 706 dirty data of the virtual memory 400 to the non-volatile memory 122 in response to a checkpoint event 704. A storage namespace module 208 associates 708 different storage namespace identifiers with data for each checkpoint event 704 and the method 700 continues with the extended memory module 702 swapping 702 data.

Figure 8:
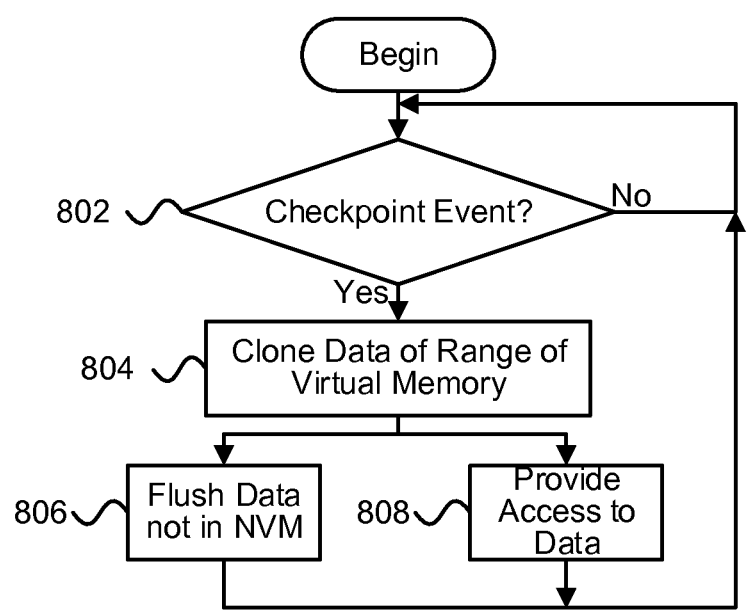
FIG. 8 is a schematic flow chart diagram illustrating a further embodiment of a method for hybrid checkpointed memory.

FIG. 8 depicts a further embodiment of a method 800 for hybrid checkpointed memory. The method 800 begins, and the checkpoint module 204 determines 802 whether there has been a checkpoint event. In response to a checkpoint event 802, the clone module 206 clones 804 data of a range of virtual memory 400 comprising data stored in volatile memory 112, 128 and data stored in a non-volatile memory medium 122. The checkpoint module 204 flushes 806 data of the range of virtual memory 400 that is stored in the volatile memory 112, 128 and not in the non-volatile memory medium 122 to the non-volatile memory medium 122. The hybrid checkpointed memory interface 133 provides access to the data of the range of virtual memory 400 while the data is being flushed 806 using one of the clone of the data and the data of the range of virtual memory 400 and the method 800 repeats.

Figure 9:
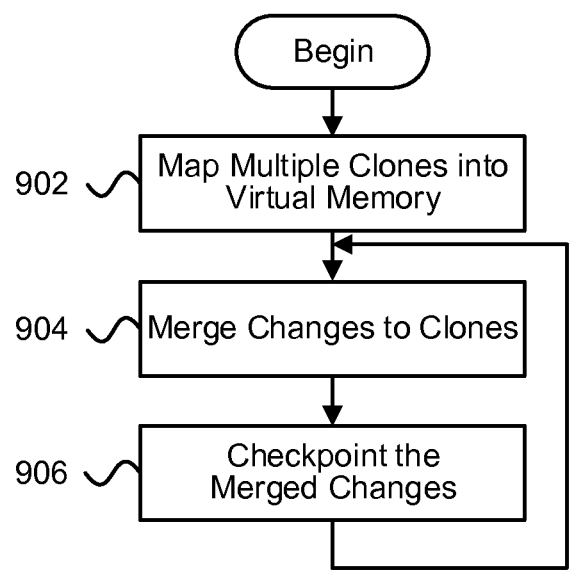
FIG. 9 is a schematic flow chart diagram illustrating an additional embodiment of a method for hybrid checkpointed memory.

FIG. 9 depicts an additional embodiment of a method 900 for hybrid checkpointed memory. The method 900 begins, and the extended memory module 202 maps 902 multiple logical clones of a file into virtual memory 400 of a host device 110. The virtual memory 400 may be backed by both volatile memory 112, 128 and non-volatile storage 122. The clone module 206 merges 904 changes to the multiple logical clones of the file in virtual memory. The checkpoint module 204 checkpoints 906 the merged changes to the non-volatile storage 122 and the method continues with the clone module 206 continuing to merge 904 subsequent changes to the multiple logical clones.

A means for mapping multiple logical clones of a file into virtual memory 400 of a host 110, in various embodiments, may include a processor 111, a storage management layer 130, a storage controller 124, a hybrid checkpointed memory module 136, an extended memory module 202, a clone module 206, other logic hardware, and/or other executable code stored on a computer readable storage medium. Other embodiments may include similar or equivalent means for mapping multiple logical clones of a file into virtual memory 400 of a host 110.

A means for merging changes to multiple logical clones of a file in virtual memory 400, in various embodiments, may include a processor 111, a storage management layer 130, a storage controller 124, a hybrid checkpointed memory module 136, a checkpoint module 204, a clone module 206, other logic hardware, and/or other executable code stored on a computer readable storage medium. Other embodiments may include similar or equivalent means for merging changes to multiple logical clones of a file in virtual memory 400.

A means for checkpointing merged changes to non-volatile storage 122, in various embodiments, may include a processor 111, a storage management layer 130, a storage controller 124, a storage media controller 126, a hybrid checkpointed memory module 136, a checkpoint module 204, other logic hardware, and/or other executable code stored on a computer readable storage medium. Other embodiments may include similar or equivalent means for checkpointing merged changes to non-volatile storage 122.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A method comprising:
 receiving a checkpoint request from a client, the checkpoint request comprising an identifier of an address range of virtual memory of a host to persist, the address range dynamically selected for the checkpoint request by the client, the virtual memory providing access, using volatile memory access semantics, to a non-volatile medium and to volatile memory of the host, the range of virtual memory addresses comprising at least a first set of addresses backed by the non-volatile medium and a second set of addresses backed by the volatile memory of the host and not by the non-volatile medium;
 referencing data of the range of virtual memory, the referenced data comprising data already stored by the non-volatile medium, for the first set of addresses;
 writing, to the non-volatile medium, data of the range of virtual memory, the written data comprising data stored by volatile memory of the host that is not stored by the non-volatile medium, for the second set of addresses; and
 providing access to the data of the range of virtual memory from the non-volatile medium using a persistent identifier associated with the referenced data and the written data.

2. The method of claim 1, further comprising copying at least a portion of the data of the range of virtual memory and providing write access to the copy while writing from the range of virtual memory to the non-volatile medium.

3. The method of claim 2, wherein the copied at least a portion of the data comprises data of a storage request received during checkpointing, the copied at least a portion of the data copied in response to the storage request.

4. The method of claim 2, wherein the copied at least a portion of the data comprises data stored in volatile memory of the host and data stored on the non-volatile medium.

5. The method of claim 2, further comprising merging data of the copied at least a portion of the data with the data of the range of virtual memory in response to completing the writing.

6. The method of claim 1, further comprising providing access to a different version of the data of the range of virtual memory using a different persistent storage namespace identifier.

7. The method of claim 1, further comprising deleting one or more inconsistent versions of the data in response to recovering from a restart event and providing a consistent version of the data to a client.

8. The method of claim 1, wherein the referencing and the writing are in response to the checkpoint request.

9. The method of claim 1, wherein writing the data comprises writing the data not stored by the non-volatile medium from volatile memory of the host to an append point of a sequential log of the non-volatile medium.

10. The method of claim 9, wherein providing access to the data of the range of virtual memory comprises providing access to portions of the data located in the sequential log based on entries for the data in an address mapping structure.

11. The method of claim 1, wherein writing the data comprises copying the data and preserving the copied data on the non-volatile medium.

12. The method of claim 1, further comprising mapping multiple clones of the data into the virtual memory of the host.

13. The method of claim 12, further comprising merging updates to the multiple clones and storing the merged data on the non-volatile medium.

14. The method of claim 13, wherein merging the updates comprises resolving conflicts in the updates based on a collision detection policy for the data.

15. The method of claim 1, further comprising locating dirty pages in the range of virtual memory using a page table to determine which data is not stored by the non-volatile medium.

16. The method of claim 1, further comprising maintaining a has-been-written data structure indicating which data of the range of virtual memory has been written since a previous checkpoint at a sub-page granularity.

17. An apparatus comprising:
  a checkpoint module configured to
    receive a checkpoint request from a client, the checkpoint request comprising an identifier of an address range of virtual memory of a host to persist, the address range dynamically selected for the checkpoint request by the client, the virtual memory providing access, using volatile memory access semantics, to a non-volatile medium and to volatile memory of the host, the range of virtual memory addresses comprising at least a first set of addresses backed by the non-volatile medium and a second set of addresses backed by the volatile memory of the host and not by the non-volatile medium,
    reference data of the range of virtual memory, the referenced data comprising data already stored by the non-volatile medium, for the first set of addresses, and
    write, to the non-volatile medium, data of the range of virtual memory, the written data comprising data stored by volatile memory of the host that is not stored by the non-volatile medium, for the second set of addresses; and
  a storage namespace module configured to provide access to the data of the range of virtual memory from the non-volatile medium using a persistent identifier associated with the referenced data and the written data,
  wherein the checkpoint module and the storage namespace module comprise one or more of logic hardware and executable code, the executable code stored on a non-transitory computer readable storage medium.

18. The apparatus of claim 17, wherein the checkpoint module is configured to copy at least a portion of the data of the range of virtual memory and provide write access to the copy while writing from the range of virtual memory to the non-volatile medium.

19. The apparatus of claim 18, wherein the copied at least a portion of the data comprises data of a storage request received during checkpointing, the copied at least a portion of the data copied in response to the storage request.

20. A computer program product comprising a non-transitory computer readable storage medium storing computer usable program code executable to perform operations, the operations comprising:
  receiving a checkpoint request from a client, the checkpoint request comprising an identifier of an address range of virtual memory of a host to persist, the address range dynamically selected for the checkpoint request by the client, the virtual memory providing access, using volatile memory access semantics, to a non-volatile medium and to volatile memory of the host, the range of virtual memory comprising at least a first set of addresses backed by the non-volatile medium and a second set of addresses backed by the volatile memory of the host and not by the non-volatile medium;
  referencing data of the range of virtual memory, the referenced data comprising data already stored by the non-volatile medium, for the first set of addresses;
  writing, to the non-volatile medium, data of the range of virtual memory, the written data comprising data stored by volatile memory of the host that is not stored by the non-volatile medium, for the second set of addresses; and
  providing access to the data of the range of virtual memory from the non-volatile medium using a persistent identifier associated with the referenced data and the written data.

21. The computer program product of claim 20, the operations further comprising copying at least a portion of the data of the range of virtual memory and providing write access to the copy while writing from the range of virtual memory to the non-volatile medium.

22. The computer program product of claim 21, wherein the copied at least a portion of the data comprises data of a storage request received during checkpointing, the copied at least a portion of the data copied in response to the storage request.

23. A system comprising:
  a non-volatile medium;
  a checkpoint module configured to
    receive a checkpoint request from a client, the checkpoint request comprising an identifier of an address range of virtual memory of a host to persist, the virtual memory providing access, using volatile memory access semantics, to the non-volatile medium and to volatile memory of the host, the range of virtual memory addresses comprising at least a first set of addresses backed by the non-volatile medium and a second set of addresses backed by the volatile memory of the host and not by the non-volatile medium,
    reference data of the range of virtual memory, the referenced data comprising data already stored by the non-volatile medium, for the first set of addresses, and
    write, to the non-volatile medium, data of the range of virtual memory, the written data comprising data stored by volatile memory of the host that is not stored by the non-volatile medium, for the second set of addresses; and
  a storage namespace module configured to provide access to the data of the range of virtual memory from the non-volatile medium using a persistent identifier associated with the referenced data and the written data.

24. The system of claim 23, wherein the checkpoint module is configured to copy at least a portion of the data of the range of virtual memory and provide write access to the copy while writing from the range of virtual memory to the non-volatile medium.

* * * * *